US012435452B2

(12) United States Patent
Kavazanjian et al.

(10) Patent No.: US 12,435,452 B2
(45) Date of Patent: Oct. 7, 2025

(54) ENZYME EXTRACTION METHODS

(71) Applicant: Arizona Board of Regents on Behalf of Arizona State University, Scottsdale, AZ (US)

(72) Inventors: Edward Kavazanjian, Tempe, AZ (US); Nasser Hamdan, Scottsdale, AZ (US); Hamed Khodadadi Tirkolaei, Tempe, AZ (US); Neda Javadi, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 85 days.

(21) Appl. No.: 17/411,590

(22) Filed: Aug. 25, 2021

(65) Prior Publication Data

US 2021/0395720 A1 Dec. 23, 2021

Related U.S. Application Data

(63) Continuation of application No. PCT/US2020/019890, filed on Feb. 26, 2020.

(60) Provisional application No. 62/810,443, filed on Feb. 26, 2019.

(51) Int. Cl.
*C09K 17/42* (2006.01)
*C12N 9/80* (2006.01)
*C12N 9/96* (2006.01)
*D01G 11/04* (2006.01)
*D02G 3/06* (2006.01)

(52) U.S. Cl.
CPC .......... *D02G 3/06* (2013.01); *C09K 17/42* (2013.01); *C12N 9/80* (2013.01); *C12N 9/96* (2013.01); *C12Y 305/01005* (2013.01); *D01G 11/04* (2013.01)

(58) Field of Classification Search
None
See application file for complete search history.

(56) References Cited

U.S. PATENT DOCUMENTS

| | | |
|---|---|---|
| 4,002,204 A | 1/1977 | Cavin |
| 5,143,155 A | 9/1992 | Ferris et al. |
| 5,670,567 A | 9/1997 | Lahalih |
| 5,730,873 A | 3/1998 | Hapka et al. |
| 5,824,725 A | 10/1998 | Lahalih |
| 6,401,819 B1 | 6/2002 | Harris et al. |
| 7,841,804 B2 * | 11/2010 | Ostvold ............. C09K 17/06 405/263 |
| 8,182,604 B2 | 5/2012 | Kucharski et al. |
| 8,420,362 B2 | 4/2013 | Crawford et al. |
| 9,850,379 B2 | 12/2017 | Li |
| 10,392,767 B2 | 8/2019 | Kavazanjian et al. |
| 10,399,130 B2 | 9/2019 | Halden et al. |
| 10,563,233 B2 | 2/2020 | Kavazanjian et al. |
| 10,724,198 B2 | 7/2020 | Kavazanjian et al. |
| 10,794,029 B2 | 10/2020 | He et al. |
| 2002/0156337 A1 | 10/2002 | Jensen et al. |
| 2007/0204990 A1 | 9/2007 | Kotlar et al. |
| 2012/0169584 A1 | 7/2012 | Hwang |
| 2012/0308306 A1 | 12/2012 | Kruse |
| 2015/0299975 A1 | 10/2015 | Li |
| 2016/0236943 A1 | 8/2016 | Sage-Passant |
| 2016/0236949 A1 | 8/2016 | Sage-Passant |
| 2016/0244931 A1 | 8/2016 | Kavazanjian et al. |
| 2016/0264463 A1 | 9/2016 | Dosier et al. |
| 2017/0029689 A1 | 2/2017 | Wilson et al. |
| 2018/0119185 A1 | 5/2018 | Kavazanjian et al. |
| 2019/0382976 A1 | 12/2019 | Kavazanjian et al. |
| 2020/0340021 A1 | 10/2020 | Kavazanjian et al. |

FOREIGN PATENT DOCUMENTS

| | | |
|---|---|---|
| JP | 2011157700 | 8/2011 |
| KR | 10-2012-1141978 | 5/2012 |
| WO | 1998/000530 | 1/1998 |
| WO | 1999005394 | 2/1999 |
| WO | 2005124100 | 12/2005 |
| WO | 2006066326 | 6/2006 |
| WO | 2007064213 | 6/2007 |
| WO | 2008/119620 | 9/2008 |
| WO | 2011078690 | 6/2010 |
| WO | 2013/120847 | 8/2013 |
| WO | 2015065951 | 5/2015 |
| WO | 2015065963 | 5/2015 |
| WO | 2017015230 | 1/2017 |
| WO | 2017139750 | 8/2017 |
| WO | 2020055915 | 3/2020 |
| WO | 2020176613 | 9/2020 |

OTHER PUBLICATIONS

Mohamed et al. (Bioresource Tech, 68, 1999, 215-223).*
Reithel (The Enzymes, Science Direct, vol. 4, 1971, Abstract).*
Agume et al. (Foods, 2017, 6(12), pp. 1-10).*
Arizona State University, Dissertation, Aug. 2021.*
Mohammed et al. (BMC Biochem., 2014, 15:15, pp. 1-8).*
Webb et al. (Plant Physiol., 1993, 103, pp. 1235-1241).*
Sehgal et al. (Plant Physiol., 1966, vol. 41, pp. 567-572).*
Van Humbeck et al., "Ammonia capture in porous organic polymers densely functionalized with brønsted acid groups." Journal of the American Chemical Society 2014, 136, pp. 2432-2440.
Van Oss et al., "Cement manufacture and the environment part II: environmental challenges and opportunities." Journal of Industrial Ecology 2003, 7, pp. 93-126.

(Continued)

*Primary Examiner* — Hope A Robinson
(74) *Attorney, Agent, or Firm* — SNELL & WILMER L.L.P.

(57) ABSTRACT

Disclosed are methods of extracting an enzyme, comprising soaking a seed in an aqueous solution, homogenizing the seed to produce a homogenized suspension, and filtering the homogenized suspension to produce a crude extract, wherein the crude extract comprises urease and non-urease proteins.

4 Claims, 10 Drawing Sheets

(56) References Cited

OTHER PUBLICATIONS

Van Oss et al., "Cement manufacture and the environment: part I: chemistry and technology." Journal of Industrial Ecology 2002, 6, pp. 89-105.

Van Paassen, Leon A. et al. "Potential soil reinforcement by biological dentrification." 2010. vol 36, pp. 168-175.

Woolard et al., "Treatment of hypersaline wastewater in the sequencing batch reactor." Water Research 1995, 29, pp. 1159-1168.

Wu et al., "Effect of cross-linking on the diffusion of water, ions, and small molecules in hydrogels." The Journal of Physical Chemistry B 2009, 113, pp. 3512-3520.

Watson et al., Air pollution engineering manual 2nd Edition, Wiley-Interscience, Hoboken, 2000, pp. 117-135.

Whiffin et al., "Microbial Carbonate Precipitation as a Soil Improvement Technique", Geomicrobiology Journal, 24, pp. 417-423 (2007).

Williams, D.A. & Greely, R. (2013). NASA's planetary aeolian laboratory: exploring aeolian precesses on earth, mars, and titan. Proceedings of the 44th lunar and planetary science conference, Houston, TX, USA.

Yasuhara et al., "Experiments and predictions of physical properties of sand cemented by enzymatically-induced carbonate precipitation." Soils and Foundations 2012, 52, pp. 539-549.

Zobeck, "Soil properties affecting wind erosion."Journal of Soil and Water Conservation 1991, 46, pp. 112-118.

Zheng et al., "Evaluation of ammonium removal using a chitosan-g-poly (acrylic acid)/rectorite hydrogel composite." Journal of hazardous materials 2009, 171, pp. 671-677.

International Preliminary Report on Patentability for PCT/US2014/062540, mailed Feb. 9, 2015.

International Preliminary Report on Patentability for PCT/US2014/062557, mailed Feb. 12, 2015.

International Preliminary Report on Patentability for PCT/US2019/50474, dated Jan. 9, 2020.

USPTO; Non-Final Office Action in the U.S. Appl. No. 15/029,316 dated Dec. 12, 2018.

USPTO; Non-Final Office Action in the U.S. Appl. No. 15/029,866 dated Jan. 11, 2019.

USPTO; Non-Final Office Action in the U.S. Appl. No. 15/803,700 dated Mar. 1, 2019.

USPTO; Non-Final Office Action in the U.S. Appl. No. 16/782,361 dated Sep. 30, 2020.

USPTO; Final Office Action in the U.S. Appl. No. 16/782,361 dated Jun. 3, 2021.

USPTO; Final Office Action in the U.S. Appl. No. 15/029,866 dated Jul. 10, 2019.

USPTO; Restriction Requirement in the U.S. Appl. No. 15/803,700 dated Jul. 12, 2018.

USPTO; Restriction Requirement in the U.S. Appl. No. 15/029,316 dated Feb. 21, 2018.

USPTO; Restriction Requirement in the U.S. Appl. No. 15/029,866 dated Mar. 7, 2018.

USPTO; Notice of Allowance in the U.S. Appl. No. 15/803,700 dated Oct. 23, 2019.

USPTO; Notice of Allowance in the U.S. Appl. No. 15/029,316 dated Jun. 19, 2019.

USPTO; Notice of Allowance in the U.S. Appl. No. 15/029,866 dated Mar. 23, 2020.

USPTO; Notice of Allowance in the U.S. Appl. No. 16/077,435 dated Mar. 16, 2020.

USPTO; Notice of Allowance in the U.S. Appl. No. 16/077,435 dated Jul. 15, 2020.

USPTO; Notice of Allowance in the U.S. Appl. No. 16/077,435 dated May 5, 2020.

International Search Report and Written Opinion for PCT/US2014/062540, mailed Feb. 9, 2015.

International Search Report and Written Opinion for PCT/US2014/062557, mailed Feb. 12, 2015.

International Search Report and Written Opinion for PCT/US2019/50474, dated Jan. 9, 2020.

Korean Intellectual Property Office; PCT International Search Report and Written Opinion, issued in connection to PCT/US2017/017649; May 22, 2017; Korea.

Korean Intellectual Property Office; International Preliminary Report on Patentability, issued in connection to PCT/US2017/017649; 4 pages; May 22, 2017; Korea.

Al Qabany et al., "Microbial Carbonate Precipitation: Correlation of S-Wave Velocity with Calcite Precipitation", Geo-Frontiers, pp. 3993-4001 (2011).

Al Qabany et al., "Factors Affecting of Microbially Induced Calcite Precipitation", J. Geotech. Geoenviron. Eng., 138, pp. 992-1001 (2012).

Angers et al., "Plant-induced changes in soil structure: processes and feedbacks." Biogeochemistry 42.1-2, 1998, pp. 55-72.

Anseth et al. "In situ forming degradable networks and their application in tissue engineering and drug delivery." J. Control. Release, 78(1), 2002, pp. 199-209.

Burbank, M., Weaver, T. Lewis, R., Williams, T., Williams, B. & Crawford, R. (2012). Geotechnical tests of sands following bioinduced calcite precipitation catalyzed by indigenous bacteria. J. Geotech. Geoenviron. Engng 139, No. 6, 928-936.

Bang et al., "Application of Novel Biological Technique in Dust Suppresion", TRB 2009 Annual Meeting (2009).

Barksdale et al., "Design Construction and Testing of Sand Compaction Piles", ASTM Special Technical Publication, pp. 4-18 (1991).

Blakeley et al., "Jack Bean Urease: The First Nickle Enzyme". Journal of Molecular Catalysis, 23, pp. 263-292 (1984).

Bercea et al., "Dextran-Based Polycations: Thermodynamic Interaction with Water as Compared With Unsubstituted Dextran, 2-Flory/Huggins Interaction Parameter." Macromolecular Chemistry and Physics 212.17, 2011, pp. 1932-1940.

Borja, "Condition for liquefaction instability in fluid-saturated granular soils", Acta Geotechnica 2006, 1, pp. 211-224.

Braissant, et al. "Bacterially induced mineralization of calcium carbonate in terrestrial environments: the role of exopolysaccharides and amino acids." J. of Sedimentary Research, 73(3), 2003, pp. 485-490.

Chou, C. Seagren, E., Aydilek, A. & Lai, M. "Biocalcification of Sand through Ureolysis." Journal of Geotechnical and Geoenvironmental Engineering 137, 1179-1189 (2011).

Chen et al., "Removal of heavy metal ions by a chelating resin containing glycine as chelating groups", Separation and purification technology 2007, 54, pp. 396-403.

Chen et al., "Biopolymer stabilization of mine tailings." J. Geotech. and Geoenviron. Eng., 139(10), 2013, pp. 1802-1807.

Chudzikowski "Guar gum and its applications." J Soc. Cosmet. Chem., 22, 1971, pp. 43-60.

Cheng et al., "Post-failure behavior of tunnel heading collapse by MPM simulation", Science China Technological Sciences 2015, 58, pp. 2139-2152.

DeJong, J., Fritzges, M. & Nusslein, K. "Microbially Induced Cementation to Control Sand Response to Undrained Shear." Journal of Geotechnical and Geoenvironmental Engineering 132, 1381-1392 (2006).

DeJong, J. et al. "Biogeochemical processes and geotechnical applications: progress, opportunities and challenges." Geotechnique 63, 287-301 (2013).

Dejong, Jason T. et al. "Bio-mediated soil improvement." Ecological Engineering, 2010, vol. 36, pp. 197-210.

Dejong, J.T. et al. "Bio-mediated Soil Improvement Field Study to Stabilize Mine Sands." 2013.

Decho "Overview of biopolymer-induced mineralization: what goes on in biofilms?" Ecological Engineering 36.2, 2010, pp. 137-144.

Demitri et al., "Potential of cellulose-based superabsorbent hydrogels as water reservoir in agriculture", International Journal of Polymer Science 2013, 2013.

Doussan et al., "Water uptake by plant roots: II-modelling of water transfer in the soil root-system with explicit account of flow within the root system-comparison with experiments", Plant and soil 283.1-2, 2006, pp. 99-117.

(56) References Cited

OTHER PUBLICATIONS

Das et al., "Purification and characterization of urease from dehusked pigeonpea (*Caianus caian* L.) seeds". Phytochemistry, 61, pp. 513-521 (2002).
Eliassi et al., "Measurement of activity of water in aqueous poly-(ethylene glycol) solutions (effect of excess volume on the Flory-Huggins x-parameter)." J. Chem. Eng. Data, 44(1), 1999, pp. 52-55.
Emerson et al., "Determination of solvent-polymer and polymer-polymer Flory-Huggins interaction parameters for poly(3-hexylthiophene) via solvent vapor swelling." Macromolecules, 46(16), 2013, pp. 6533-6540.
Ercole et al., "Bacterially induced mineralization of calcium carbonate: the role of exopolysaccharides and capsular polysaccharides." Microscopy and Microanalysis, 13(01), 2007, pp. 42-50.
Estroff et al., "An organic hydrogel as a matrix for the growth of calcite crystals." Org. Biomol. Chem., 2(1), 2004, pp. 137-141.
Faschingleitner et al., "Evaluation of primary and secondary fugitive dust suppression methods using enclosed water spraying systems at bulk solids handling," Advanced Powder Technology, 22, 2011, pp. 236-244.
Fernando et al., "Forecasting PM10 in metropolitan areas: Efficacy of neural networks." Environmental pollution 163, 2012, pp. 62-67.
Fu et al., "Thermochemistry and kinetics of chemical polymerization of aniline determined by solution calorimetry." Chemistry of materials 6.5, 1994, pp. 671-677.
Farouz et al., "Evaluation of Axial Capacity of Post Grouted Drilled Shafts", GeoShanghai 2010 International Conference, pp. 216-223 (2010).
Galán-Marín et al., "Clay-based composite stabilized with natural polymer and fibre."Construction and Building Materials 2010, vol. 24, pp. 1462-1468.
Garrigues et al., "Water uptake by plant roots: I-Formation and propagation of a water extraction front in mature root systems as evidenced by 2D light transmission imaging." Plant and Soil 2006, 283, pp. 83-98.
Germishuizen et al., "A laboratory study of soil stabilisation with a urea-formaladehyde resin", Journal of the South African Institution of Civil Engineering, 44, pp. 9-12 (2002).
Greely, R., Leach, R., White, B., Iversen, J. & Pollack, J. (1980). Threshold windspeeds for sand on mars: wind tunnel simulations. Geophys. Res. Lett. 7, No. 2, 121-124.
Greeley, R., White, B.R., Pollack, J.B., Iversen, J.D. & Leach, R.N. (1981). Dust storms on mars: considerations and simulations. Geol. Soc. Am. Special Papers 186, 101-122.
Hamdan et al., "Carbonate Cementation via Plant Derived Urease," Proceedings of the 18th International Conference on Soil Mechanics and Geotechnical Engineering, Paris 2013.
Hamdan et al., "Sequestration of Radionuclides and Metal Contaminants through Microbially-Induced Carbonate Precipitation", 2011 Pan-Am CGS Geotechnical Conference, (2011).
Hamdan et al., "Carbonate Mineral Precipitation for Soil Improvement through Microbial Dentrification", Geo-frontiers 2015, pp. 3925-3934.
Harkes et al., "Fixation and distribution of bacterial activity in sand to induce carbonate precipitation for ground reinforcement", Ecological Engineering, 36, pp. 112-117 (2010).
Hoffmann, "Conventional and Environmentally-sensitive Hydrogels for Medical and Industrial Uses: A Review Paper." Polymer Gels, 1991, pp. 289-297.
He, J., Chu, J., & Ivanov, V.(2013) "Mitigation of Liquefaction of Saturated Sand using Biogas," Geotechnique, 63(4), 367-275.
Ivanov et al., "Applications of microorganisms to geotechnical engineering for bioclogging and biocementation of soil in situ", Rev Environ Sci Biotechnol, 7, pp. 139-153 (2008).
Jones et al., "Effects of temperature, pH, salinity, and inorganic nitrogen on the rate of ammonium oxidation by nitrifiers isolated from wetland environments." Microbial Ecology 1980, 6, pp. 339-347.
Jabri et al., Preliminary crystallographic studies of urease from jack bean and from Klebsiella aerogenes, Journal of Molecular Biology, 227, pp. 934-937 (1992).
Kavazanjian E. and Hamdan N. (2015). "Enzyme induced carbonate precipitation (EICP) columns for ground improvement." Proc. of the 2015 ASCE Geo-Institute GeoCongress, San Antonio, Texas.
Kavazanjian, E. Jr and Karatas, I. (2008). Microbiological improvement of the physical properties of soil. Proceedings of 6th international conference on case histories in geotechnical engineering, Rolla, MO, USA, pp. 58-66.
Almajed, Abdullah, et al. (2018). "Enzyme Induced Biocementated Sand with High Strength at Low Carbonate Content."
King et al., "Post Grouted Drilled Shafts—A Comprehensive Case History from Texas", Contemporary Topics in Deep Foundations, pp. 31-38 (2009).
Karraker et al., "Impacts of road deicing salt on the demography of vernal pool-breeding amphibians." Ecological Applications 2008, 18, pp. 724-734.
Kherb et al., "Role of carboxylate side chains in the cation Hofmeister series." The Journal of Physical Chemistry B 2012, 116, pp. 7389-7397.
Kim et al., "Hydrogel-actuated integrated responsive systems (HAIRS): Moving towards adaptive materials." Current Opinion in Solid State and Materials Science 2011, 15, pp. 236-245.
Lambers, "Introduction, dryland salinity: a key environmental issue in southern Australia." Plant and Soil 2003, 257, v-vii.
Marzadori et al "Immobilization of Jack Bean Urease on Hydroxyapatite Urease Immobilization in Alkaline Soils", Soil Biology and Biochemistry, 30, pp. 1485-1490 (1998).
Mullins et al., "Predicting End Bearing Capacity of Post-Grouted Drilled Shaft in Cohesionless Soils", Journal of Geotechnical and Geoenvironmental Engineering, 132, pp. 476-487 (2000).
Maghchiche et al., "Use of polymers and biopolymers for water retaining and soil stabilization in arid and semiarid regions." Journal of Taibah University for Science 2010, 4, pp. 9-16.
McKenna Neuman et al., "Wind tunnel simulation of environmental controls on fugitive dust emissions from mine tailings." Atmospheric Environment 2009, 43, pp. 520-529.
Mehta, "Reducing the environmental impact of concrete."Concrete international 2001, 23, pp. 61-66.
Meyer et al., "Microbiologically-Induced Soil Stabilization: Application of Sporosarcina pasteurii for Fugitive Dust Control." Proc. of the 2011 ASCE Geo-Frontiers, Advances in Geotechnical Engineering, 2011, pp. 4002-4011.
Monlux et al., U.S. Department of Agriculture, Forest Service, National Technology and Development Program 06771805-SDTDC, 2006, 1-23.
Martinez, B.C., DeJong, J.T., Ginn, T.R., Montoya, B.M., Barkouki, T.H., Hunt C., Tanyu, B., Major, D. (2013) "Experimental Optimization of Microbial-induced Carbonate Precipitation for Soil Improvement," Journal of Geotechnical and Geoenvironmental Engineering, V 139: 587-598.
Nemati et al. "Modification of porous media permeability, using calcium carbonate produced enzymatically in situ." Enzyme and Microbial Technology 2003, 33, pp. 635-642.
Neupane et al., "Soil Improvement through enzymatic calcite precipitation technique: small to large scale experiments." Int. J. Lsld. Env. 2013, 1, pp. 65-66.
Neupane et al., "Applicability of enzymatic calcium carbonate precipitation as a soil-strengthening technique." Journal of Geotechnical and Geoenvironmental Engineering, 2013, vol. 139, pp. 2201-2211.
Ng et al., "An Overview of the Factors Affecting Microbial-Induced Calcite Precipitation and its Potential Application in Coil Improvement", World Academy of Science, Engineering and Technology, 62, pp. 723-729 (2012).
Ni et al., "Pervious Concrete Pile: An Innovation Ground Improvement Alternative", Geo-Congress 2013, pp. 2058-2065 (2013).
Ozdogan et al., "A study on the triaxial shear behavior and microstructure og biologically treated specimens", University of Delaware, (2010).
Oades et al., Australian Journal of Soil Research 1991, 29, 815-828.
Orts et al., J. Mater. Civ. Eng. 2007, 19, pp. 58-66.

(56) References Cited

OTHER PUBLICATIONS

Pettit et al., "Soil Urease: Activity, Stability and Kinetic Properties", Soil Biology and Biochemistry, 8, pp. 479-484 (1976).

Prusinski et al., "Effectiveness of Portland cement and lime in stabilizing clay soils." Transportation Research Record: Journal of the Transportation Research Board 1999, 1652, pp. 215-227.

Mohamed, Tarek M., et al. "Purification of urease from water melon seeds for clinical diagnostic kits." (1999). Bioresource Technology vol. 68 p. 215-223.

Sumathi et al., "Impact of indigenous microorganisms on soil microbial and enzyme activities", Scholars Research Library, Archives of Applied Science Research, 4, pp. 1065-1073 (2012).

Stern et al., "Economic growth and environmental degradation: the environmental Kuznets curve and sustainable development." World Development 1996, 24, pp. 1151-1160.

Schlumberger, "Unconfined compressive strength," Feb. 3, 2017, retrieved on Dec. 16, 2019 from https://web.archive.org/web/20170203220634/https://www.glossary.oilfield.slb.com/en/terms/u/unconfined_compressive_strength.aspx.

Sciarra et al., "Soil-gas survey of liquefaction and collapsed caves during the Emilia seismic sequence." Annals of Geophysics 2012, 55.

Tanaka et al., "Use of fall cone test as measurement of shear strength for soft clay materials." Soils and Foundations 2012, 52, pp. 590-599.

Talukdar et al., "Swelling and drug release behaviour of xanthan gum matrix tablets." Inter. J. of Pharmaceutics, 1995, 120(1), pp. 63-72.

Van Paassen, L. Ghose, R. Van Der Linden, T., Van Der Star, W. & Van Loosdrecht, M. "Quantifying Biomediated Ground Improvement by Ureolysis: Large-Scale Biogrout Experiment." Journal of Geotechnical and Geoenvironment Engineering 136, 1721-1728 (2010).

USPTO, Restriction Requirement dated Oct. 5, 2023 in U.S. Appl. No. 17/192,337.

* cited by examiner

ENZYME EXTRACTION METHODS

CROSS REFERENCE TO RELATED APPLICATION

This application is a continuation of PCT Patent Application No. PCT/US2020/019890 filed Feb. 26, 2020 and entitled "ENZYME EXTRACTION METHODS". PCT Patent Application No. PCT/US2020/019890 is a non-provisional of, and claims priority to, U.S. Provisional Patent Application No. 62/810,443, filed on Feb. 26, 2019, and entitled "ENZYME EXTRACTION METHODS". Each of the foregoing applications is hereby incorporated by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

FEDERALLY SPONSORED RESEARCH OR DEVELOPMENT

This invention was made with government support under grant number EEC-1449501 awarded by the National Science Foundation. The government has certain rights in the invention.

TECHNICAL FIELD

The present disclosure relates generally to enzyme extraction methods, and more specifically, extraction of enzymes used in biocementation systems and methods.

BACKGROUND

Biologically based calcium carbonate precipitation is being developed as a sustainable binder for granular soils, a process sometimes referred to as biocementation. Carbonate precipitation via hydrolysis of urea is one technique that has been investigated by geotechnical researchers for use in binding granular soil particles together. Carbonate precipitation via hydrolysis of urea can also be used for sealing cracks in concrete and stone and for creating a carbonate crust for fugitive dust control, among other application. This technique utilizes the urease enzyme to catalyze the hydrolysis of urea in an aqueous solution, causing alkalinity changes and forming carbonate ions that leads to calcium carbonate precipitation in presence of calcium ions. One method of carbonate precipitation via hydrolysis of urea employs ureolytic microbes (microbes containing intracellular urease) as the source of urease and is referred to as microbially induced carbonate precipitation (MICP). Another method of carbonate precipitation uses agriculturally derived free urease enzyme as the source of urease, a process referred to as enzyme induced carbonate precipitation (EICP).

In EICP, free urease enzyme catalyzes the precipitation of calcium carbonate from an aqueous solution of urea and calcium chloride. However, the cost of urease enzyme is a barrier to adoption of EICP in engineering applications. Enzyme used to precipitate calcium carbonate in engineering applications has typically been commercially available urease, or free urease, resulting from a multi-step extraction and purification process. Commercially available urease enzyme is expensive, as it is produced in a purified form for research purposes and for sensitive applications (e.g., food industry, medical purposes) with a gram-scale need. Practical applications of free urease enzyme (e.g., EICP) for civil and materials engineering purposes may require a kilogram-scale supply of urease. Therefore, lowering the price of readily transportable and stable urease enzyme is desirable to make engineering applications of EICP cost effective.

SUMMARY

As disclosed herein, a method of extracting an enzyme may comprise soaking a seed in an aqueous solution, homogenizing the seed to produce a homogenized suspension, and filtering the homogenize suspension to produce a crude extract, wherein the crude extract comprises urease and non-urease proteins.

The method may further comprise at least one of lyophilizing and drying the crude extract to produce a powdered crude extract. In various embodiments, the aqueous solution comprises water. In various embodiments, the seed comprises a urease-rich agricultural product. In various embodiments, the urease-rich agricultural product comprises at least one of jack bean, jack bean meal, soybean, soybean meal, and watermelon seed. In various embodiments, the filtering comprises passing the homogenized suspension through a first filter to produce a solution, and passing the solution through a second filter to produce a crude extract. In various embodiments, the second filter comprises glass wool.

As disclosed herein, a biocementation solution may comprise urea, a source of calcium ions, an enzyme stabilizer, and a crude extract, wherein the crude extract is derived from jack beans and comprises urease and non-urease proteins.

In various embodiments, the crude extract is produced by a method comprising soaking a seed in an aqueous solution, homogenizing the seed to produce a homogenized suspension, and filtering the homogenize suspension to produce a crude extract, wherein the crude extract comprises urease and non-urease proteins. In various embodiments, the method further comprises at least one of lyophilizing and drying the crude extract to produce a powdered crude extract. In various embodiments, the aqueous solution comprises water. In various embodiments, the seed comprises a urease-rich agricultural product. In various embodiments, the urease-rich agricultural product comprises at least one of jack bean, jack bean meal, soybean, soybean meal, and watermelon seed. In various embodiments, the filtering comprises passing the homogenized suspension through a first filter to produce a solution, and passing the solution through a second filter to produce a crude extract. In various embodiments, the second filter comprises glass wool.

As disclosed herein, a method of extracting an enzyme may comprise soaking a urease-rich agricultural product in water, homogenizing the urease-rich agricultural product to produce a homogenized suspension comprising course solids, urease, and non-urease proteins, physically separating the course solids from the urease and the non-urease proteins to produce a crude extract, and at least one of lyophilizing and drying the crude extract to produce a powdered crude extract, wherein the powdered crude extract comprises urease and non-urease proteins.

These and other aspects of the present disclosure will become apparent upon reference to the following detailed description and attached drawings. All references disclosed herein are hereby incorporated by reference in their entirety as if each was incorporated individually.

BRIEF DESCRIPTION OF THE DRAWINGS

With reference to the following description and accompanying drawings.

DETAILED DESCRIPTION

Figure 1:
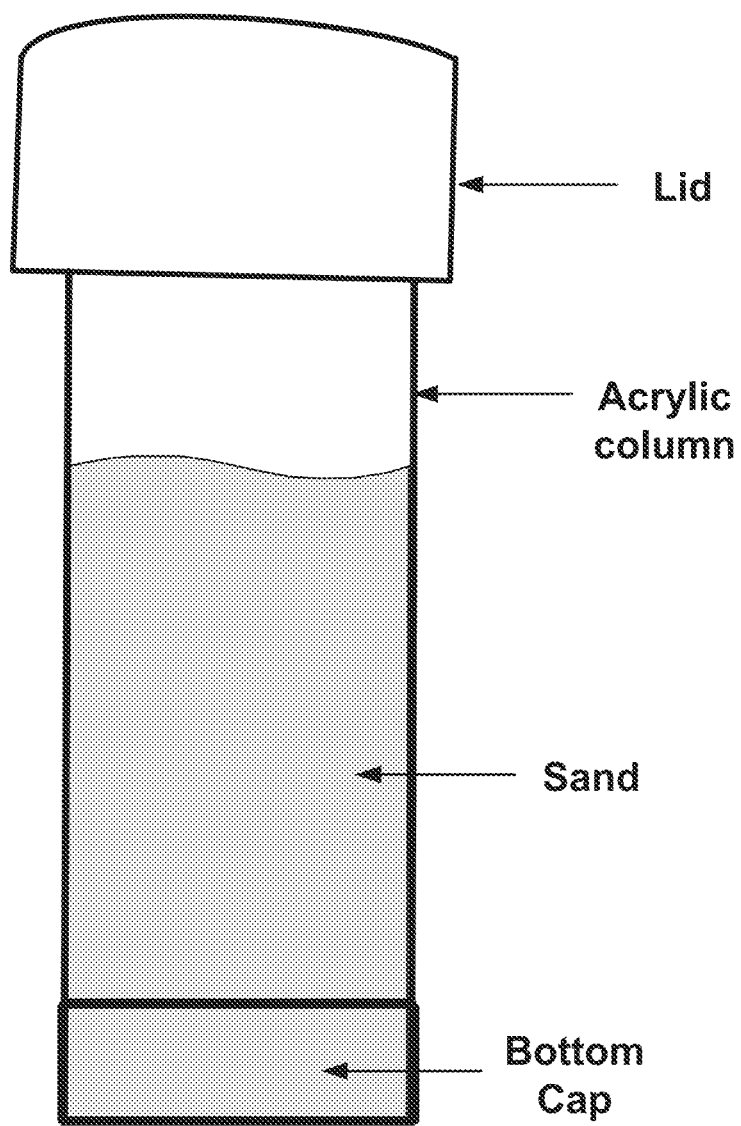
FIG. 1 illustrates a typical EICP soil treatment column, in accordance with various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for energy dispersive x-ray analysis, x-ray diffraction, microbially-induced carbonate precipitation, compression testing, and/or the like may not be described in detail herein. As applicable, the connecting lines that may appear in figures contained herein may represent exemplary functional relationships and/or physical couplings between various elements. It should be noted that many alternative or additional functional relationships or physical connections may be present in practical methods of enzyme extraction and/or biocementation systems, related methods, and/or products arising therefrom.

Principles of the present disclosure contemplate the development of methods of enzyme extraction, treatment, preparation for transport, and use in biocementation. Exemplary embodiments disclose extraction methods that may result in improved enzymatic activity, and/or that may utilize smaller quantities of reagents, and/or that may result in decreased cost per gram of enzyme produced.

As used herein, "EICP" is used interchangeably with "enzyme induced carbonate precipitation" and refers to methods of carbonate precipitation via hydrolysis of urea (ureolysis) that use agriculturally-derived free urease enzyme as a source of urease. EICP occurs when, under certain environmental conditions (e.g., pH), the hydrolysis of urea leads to carbonate precipitation in the presence of divalent cations.

As used herein, "EICP-treated soil" means soil that has been treated with one or more of the methods disclosed herein.

As used herein, "carbonate precipitation" means mineral precipitation that may include one or more cations that may produce one of several phases of carbonate minerals, including but not limited to calcite. In a preferred embodiment, calcium carbonate precipitates form cementation bonds at inter-particle contacts in the starting material and fill in void spaces in the starting materials (thereby increasing the tendency of the starting material to dilate, or expand in volume, when sheared), and/or cementation of adjacent particles of the starting material.

As used herein, "purification fold" is a figure is determined by dividing the specific activity of an extract after a purification step by the specific activity of the crude extract (initial specific activity). Purification fold shows the efficiency of each purification step in removing non-protein cellular components and reducing the amounts of non-target proteins.

As used herein, "specific urease activity" means the figure obtained by dividing the urease activity by the total amount of protein (U/mg of protein). Specific activity is an indication of purity of an extract.

As used herein, "total units" is a measure of urease content in extracted solutions, which is commonly used in the enzyme extraction literature to express the efficacy of an extraction process. Total units of urease in an extraction solution was calculated as urease activity multiplied by solution volume. The total units of urease in a given volume of extract represents the rate at which ammonia can be liberated by that volume of extract in a saturated urea solution (i.e., initial urea concentration is higher than the affinity constant of the enzyme, km, by more than an order of magnitude).

As used herein, "unit yield" means the total number of units in each extract divided by the initial mass of raw material used for extraction (i.e. urease content per gram of raw material, U/g of raw material). It represents the efficiency of the extraction process in terms of the amount of extracted enzyme.

As used herein, "urease activity" means the micromoles of ammonia liberated per minute by 1 ml (if liquid) or 1 g (if powder) of urease enzyme (i.e., U/g or U/ml).

An exemplary method of enzyme extraction is disclosed herein. The method may be configured to extract an enzyme from an agricultural product, for example, from a seed. In various embodiments, the seed comprises a jack bean (*Canavalia ensiformis*). However, the agricultural product may comprise one or more of jack bean, jack bean meal, soybean, soybean meal, watermelon seed, or any other agricultural product with a suitable level of urease. In various embodiments, the agricultural produce is processed prior to use in the disclosed method. For example, the agricultural product may comprise dehusked jack bean and/or jack bean meal. However, in various embodiments the agricultural product is not processed prior to, or during, the method disclosed herein.

In various embodiments, the method comprises soaking the agricultural product in an aqueous solution. The aqueous solution may comprise water. The aqueous solution may comprise a buffered solution. The aqueous solution may comprise a phosphate buffer. The aqueous solution may comprise ethylenediaminetetraacetic acid (EDTA). In various embodiments, the aqueous solution comprises 20 mM phosphate buffer and 2 mM EDTA. However, the aqueous solution may comprise any suitable aqueous solution. In various embodiments, the aqueous solution may comprise a pH of about 7 to about 8 and a temperature of about 2° C. to about 10° C. However, the aqueous solution may comprise any suitable pH and any suitable temperature.

The agricultural product may be soaked in aqueous solution for approximately 12 to 24 hours. The agricultural product may be soaked in aqueous solution for approximately 1 to 48 hours. However, in various embodiments, the agricultural product is soaked in aqueous solution for any time suitable to facilitate extraction of urease and non-urease proteins.

In various embodiments, the method comprises homogenizing the agricultural product. The agricultural product may be homogenized before or after being soaked in aqueous solution. In various embodiments, the homogenizing comprises blending the soaked agricultural product and aqueous solution to produce a slurry, suspension, and/or paste. The homogenized suspension may comprise solubilized urease, solubilized non-urease proteins, and/or coarse solids.

In various embodiments, the method further comprises physically separating the coarse solids from the homogenized suspension to produce a crude extract. In various embodiments, the crude extract comprises solubilized urease and/or non-urease proteins. The physically separating may comprise centrifugation. In various embodiments, the homogenized suspension is centrifuged for about 15 minutes at about 21500 g. However, any suitable method of centrifugation may be utilized. The physically separating may comprise filtration. The filtering may comprise passing the homogenized suspension through a first filter. In various embodiments, the first filter comprises cheesecloth. In various embodiments, the cheesecloth comprises grade-10 cheesecloth, grade-40 cheesecloth, grade-50 cheesecloth, grade-60 cheesecloth, grade-80 cheesecloth, grade-90 cheesecloth, or any other suitable grade of cheesecloth. However, the first filter may comprise any filter suitable for removing coarse solids from the homogenized suspension.

In various embodiments, the filtering comprises passing the homogenized suspension through a second filter. The second filter may comprise glass wool. In various embodiments, the glass wool is configured to remove some or of certain fractions including all fats and/or fatty acids from the homogenized suspension. However, in various embodiments, the second filter may comprise any suitable filter capable of allowing solubilized urease to remain in the resulting filtrate.

In various embodiments, the method further comprises lyophilizing (freeze-drying), rotary evaporation, oven-drying and/or any method for dehydrating the crude extract without significantly disrupting the efficiency of the urease to produce a powdered crude extract. In various embodiments, the lyophilizing removes a substantial portion of the water in the crude extract such that the powdered crude extract is smaller in volume and, therefore, more easily and cost-effectively transported. In various embodiments, the lyophilizing removes a substantial portion of the water in the crude extract such that the powdered crude extract is smaller in weight and, therefore, more easily and cost-effectively transported. Lyophilization may improve the ease, efficiency, and/or cost of transporting, handling, delivering, and/or applying the crude extract in biocementation methods.

In various embodiments, the lyophilizing stabilizes at least one of the urease and the non-urease proteins in the crude extract. Stabilization may increase active shelf life as compared to enzymes in liquid extract form. Stabilization may improve the ease, efficiency, and/or cost of transporting, handling, delivering, and/or applying the crude extract in biocementation methods.

In various embodiments, the powdered crude extract comprises a urease activity that is greater than commercially-available urease sources. In various embodiments, the powdered crude extract comprises a urease concentration and/or a non-urease protein concentration that is greater than commercially-available urease sources. In various embodiments, the powdered crude extract comprises a urease concentration that is lower than commercially-available urease sources. In various embodiments, methods of biocementation may be more effective when a powdered crude extract comprises a lower concentration of urease. In various embodiments, the concentration of urease in powdered crude extract may be optimized for a desired application (e.g., surface, soil, sand, etc.) and/or outcome (mass, compressive strength, tensile strength, etc.).

In various embodiments, urease contained in the powdered crude extract retains its enzymatic activity after lyophilization and/or rehydration. In various embodiments, the method of producing powdered crude extract, as disclosed herein, does not rely on costly or complex equipment, reagents, or methods, for example, ultra-centrifugation or chemical extraction. In various embodiments, the powdered crude extract may be a relatively impure source of urease. Stated differently, the powdered crude extract may comprise urease and non-urease proteins.

In various embodiments, the powdered crude extract may be utilized in a method of biocementation and related systems and/or products. The powdered crude extract may be mixed with other elements of a biocementation solution (e.g., urea, calcium chloride, water, non-fat dry milk, etc.) in appropriate proportions for engineering applications of EICP, including biocementation for ground improvement, sealing of cracks in concrete and stone, and fugitive dust control.

In various embodiments, practice of the method disclosed herein reduced the commercial cost of enzyme required for biocementation by a factor of approximately 40 or more. In various embodiments, the method of biocementation comprises treating granular, cohesionless material with EICP. In various embodiments, the material comprises sand. However, in various embodiments the material may comprise one or more of sand, silt, soil, clay, sediments, sawdust, fractured crystalline rocks, cracked concrete and sedimentary rocks including but not limited to conglomerate, breccia, sandstone, siltstone, shale, limestone, gypsum, and dolostone.

In various embodiments, the material(s) to be biocemented is/are treated with a solution comprising urea, urease, non-urease proteins, a source of calcium ions, and an enzyme stabilizer. In various embodiments, the source of calcium ions is calcium chloride dihydrate. In various embodiments, the source of calcium ions is anhydrous calcium chloride. However, the solution may comprise any source of calcium ions suitable for use in biocementation. In various embodiments, the urease comprises a powdered crude extract, as disclosed herein.

In various embodiments, the enzyme stabilizer comprises a dairy product. In various embodiments, the enzyme stabilizer comprises a bovine dairy product. In various embodiments, the enzyme stabilizer comprises casein. In various embodiments, the enzyme stabilizer comprises non-fat milk powder.

In various embodiments, the enzyme stabilizer stabilizes urease and/or facilitates precipitation. The enzyme stabilizer may stabilize urease against environmental changes. Interaction between the enzyme stabilizer and calcium ions may provide nucleation points for carbonate precipitation. Interaction between the enzyme stabilizer and calcium ions may improve carbonate precipitation efficiency and/or yield. Interaction between casein and calcium ions may provide nucleation points for carbonate precipitation. In various embodiments, the enzyme stabilizer lowers the rate of carbonate precipitation. The enzyme stabilizer may chelate calcium ions. Casein may chelate calcium ions. In various embodiments, chelation of calcium ions slows the rate of carbonate precipitation. A slowed rate of carbonate precipitation may be beneficial to the morphology and/or crystal growth of the precipitate.

The relatively large calcite crystals precipitated in the specimens treated with the modified (milk-containing) EICP solutions may be due to the slower rate of precipitation. Molecular interactions between urease enzyme and milk proteins may reduce the accessibility of active sites on the enzyme to urea and consequently lower the precipitation rate, consistent with the findings of Bachmeier et al. Casein in the milk may also act as a chelating agent reducing the precipitation rate. In addition, casein might precipitate and provide nucleation sites that favor calcite crystal formation and growth.

In various embodiments, the biocementation solution comprises about 0.67 M calcium ions. However, the biocementation solution may comprise any suitable concentration of calcium ions. In various embodiments, the biocementation solution comprises about 1.0 M urea. However, the biocementation solution may comprise any suitable urea concentration. In various embodiments, the biocementation solution comprises about 3 grams/liter urease having activity of about 3500 Units/g. However, the biocementation solution may comprise any suitable urease concentration at any suitable activity level. In various embodiments, the biocementation solution comprises 4 grams/liter non-fat milk powder. However, the biocementation solution may comprise any suitable enzyme stabilizer concentration.

Example 1

Urease Crude Extraction

Jack bean was soaked in tap water overnight. 200 ml of water was added for every 50 grams of jack bean. The mixture was then homogenized in a kitchen blender for around 2 minutes to disrupt the cells and tissues for enzyme extraction. The homogenized mixture was then passed through kitchen cheesecloth fabric to separate coarse solids from the solution. The filtrate was then passed through glass wool to remove the excess fats from the solution. The solution obtained in this manner is referred to herein as crude extract.

Powdering the Crude Extraction Solution

Either lyophilization (freeze-drying) or rotary evaporation was used to remove water from the crude extract and to obtain a powdered crude extract, thereby significantly reducing the volume and weight of the extract.

Soil Treatment Using Extracted Enzyme

The crude jack bean urease extract was used for EICP treatment of granular soil (i.e., Ottawa 20-30 silica sand from US Silica Inc., emax=0.74, emin=0.50, D50=0.7 mm). The same soil was treated in the same manner using three commercially available sources of urease enzyme. The EICP-treated soil was then subject to unconfined compressive strength (UCS) testing. The UCS strength of the specimens treated via EICP using the jack bean crude extract was compared to the UCS strength of specimens treated with the three commercial jack bean urease enzymes: Fisher Chemical urease powder; Sigma-Aldrich Type III, glycerol solution (low activity Sigma-Aldrich); and Sigma-Aldrich Type III, powder (high activity Sigma-Aldrich). The treatment solution consisted of 1.0 M urea, 0.67 M CaCl2-dihydrate, 4 g/l non-fat milk powder, and around 13,000 Units of free urease enzyme per liter. The number of Units of enzyme used here is equivalent to that provided by commercially available Fisher enzyme at a concentration of 3 g/l, which may be utilized in EICP soil improvement (Almajed et al. 2018). One pore volume of treatment solution was percolated into a 5.1 cm-inner diameter by 10.2 cm-tall closed bottom soil column containing the Ottawa 20-30 silica sand at a relative density of around 78%. FIG. 1 shows one of the soil columns during treatment. Three specimens were treated for each EICP solution.

The EICP-treated specimens were extracted from their columns after a curing period of around three days at room temperature, soaked in DI water to remove soluble salts, and then subject to UCS testing while still in their nearly saturated (i.e., soaked) condition at a strain rate of 1.27 mm/min. Afterwards, around 250 g of each specimen were used for determination of carbonate content using gravimetric acid digestion. In this method, the treated soil was soaked in 4 M hydrochloric acid to dissolve the carbonate. The difference between the mass of dry soil before and after acid digestion represents the mass of precipitation. Mass of precipitation over the mass of dry soil after digestion was considered as the carbonate content of the treated specimen. All the tests were conducted in triplicate and the results are presented in FIG. 2 as the average value of the three tests with the associated maximum and minimum values.

Microscale Identification

Scanning electron microscopy (SEM) was employed to evaluate the morphology of the precipitates in the treated specimens. Energy dispersive X-ray (EDX) spectroscopy was used for elemental identification of the precipitates. The samples were sputter-coated with gold (Au) prior to SEM imaging and EDX spectroscopy.

Soil Treatment

Figure 2:
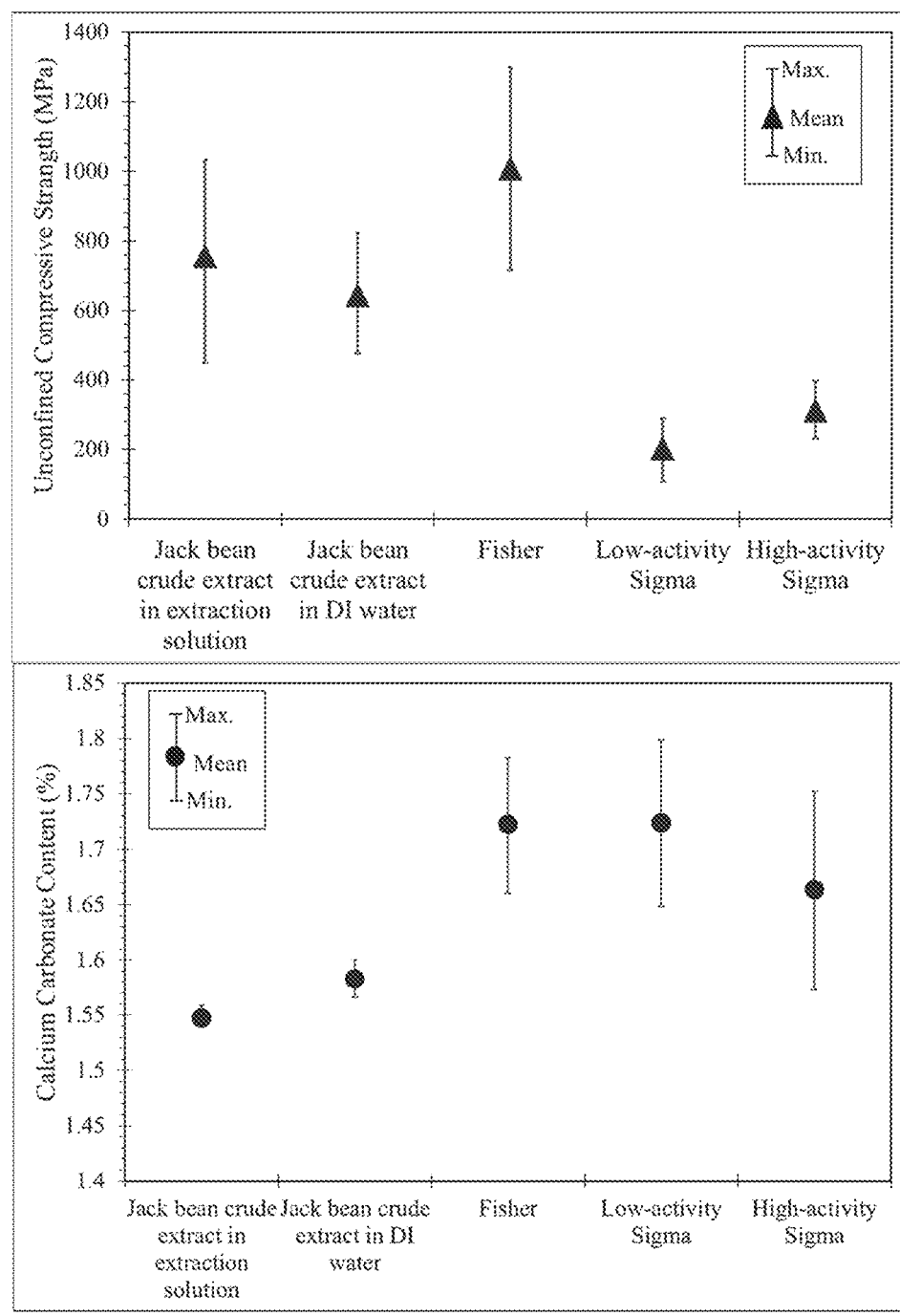
FIG. 2 illustrates the results of UCS and carbonate content testing for EICP-treated specimens, in accordance with various embodiments.

FIG. 2 compares the results of UCS testing and carbonate content measurement for the treated specimens. As presented in FIG. 2, the specimens treated with the crude jack bean extract had similar UCS and carbonate content to the specimens treated with Fisher Chemical enzyme and higher UCS than the specimens treated with high-activity and low activity Sigma-Aldrich enzymes. Other than the difference in strength between the specimens treated with the crude extract (liquid and powdered) and the Fisher Chemical enzyme and the specimens treated with the Sigma-Aldrich enzymes, there may or may not be a trend between carbonate content and strength over the very narrow range of carbonate content achieved in these tests (i.e., from 1.55% to 1.75% calcium carbonate content by dry weight). The amount of precipitates in all of the specimens is slightly higher than the theoretical maximum (about 1.5%), which might be due to the presence of ammonium chloride salts in the treated specimens which have not been completely washed off by soaking in water.

Figure 3:
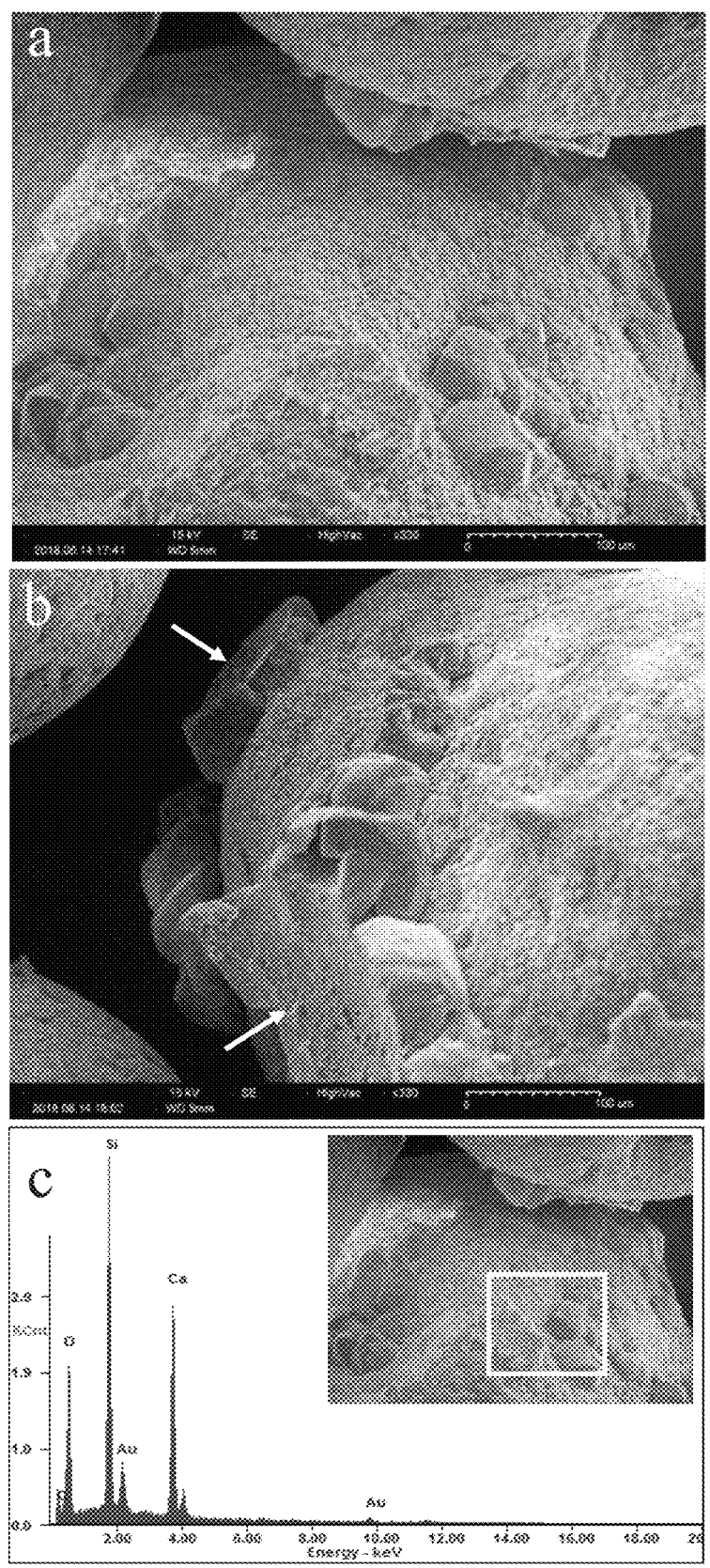
FIG. 3 illustrates SEM images of the specimens treated with (a) low-activity Sigma enzyme and (b) crude jack bean enzyme extracted in water; and (c) EDX analysis of the precipitates on a treated specimen (arrows point to broken inter-particle bonds), in accordance with various embodiments.

FIG. 3 presents representative results of SEM imaging and EDX spectroscopy. The images and data in FIG. 3 are on specimens treated using the low-activity Sigma enzyme and crude jack bean extract. All treated specimens showed a similar morphology of precipitated calcium carbonate as predominantly calcite. The SEM images show the precipitation of rhombohedral crystals (characteristic of calcite) on the sand particles surface in all specimens. The presence of Ca, O, and C elements in the EDX spectrum may be attributed to the elemental composition of the calcium carbonate precipitates from EICP treatment of a clean silica sand. Therefore, the rhombohedral precipitates that developed in the treatment process described herein may comprise a calcite phase of calcium carbonate.

Example 2

EICP Treatment Solution. EICP treatment solutions were prepared by dissolving calcium chloride dihydrate ($CaCl_2 \cdot 2H_2O$), urea, urease enzyme (with activity of ≈3500 U/g), and, in some cases, non-fat milk powder into 18.2 M2 deionized (DI) water. Three different EICP treatment solutions were employed for soil treatment. Solution 1, referred to as the baseline EICP solution, was composed of 1.0 M urea, 0.67 M calcium chloride, and 3 g/l enzyme. These concentrations were selected based on our previous study. Solution 2, referred to as the modified EICP solution, was composed of 1.0 M urea, 0.67 M calcium chloride, 3 g/l enzyme, and 4 g/l non-fat milk powder. Solution 3, referred to as the low concentration modified EICP solution, was composed of 0.37 M urea, 0.25 M calcium chloride, 0.85 g/l enzyme, and 4 g/l non-fat milk powder.

Soil Treatment.

Ottawa 20/30 sand (mean grain size of 0.6 mm; maximum void ratio, emax, =0.742; minimum void ratio, emin, =0.502; specific gravity of solids, Gs, =2.65; 99% $SiO_2$) was treated with the three different EICP solutions. Two specimens were prepared using Solution 1, three specimens were prepared using Solution 2, and two specimens were prepared using Solution 3. Test specimens were prepared by thoroughly mixing 350 g of sand with 75 ml (about one pore volume) of the EICP solution and then immediately placing the mixture into a 5.08 cm-(2 inch-) diameter acrylic column in three lifts. Each lift of sand was then gently tamped so that the sand in the cylinder reached a final height of 10.16 cm (4 inches) above the base, corresponding to a relative density of 76%. Following densification of the sand by tamping, the treatment solution was always a few millimeters above the soil surface, indicating that the packed soil was in a near saturated condition. The top of each column was closed with aluminum foil in order to minimize loss of solution by evaporation. Each column was allowed to cure at room temperature (approximately 20° C.) for 3 days. After the curing, the specimens were rinsed with about one pore volume of DI water and then oven-dried at 40° C. until no change in mass was observed. The dried specimens were subject to unconfined compression strength testing at a constant axial strain rate of 1.27 mm/minute.

Carbonate Content Measurement.

Gravimetric acid digestion was employed to measure the carbonate content of a portion of each specimen following unconfined compression testing. About 80-100 g of each specimen was soaked into 4 M hydrochloric acid solution. The soaked specimen was then rinsed and dried. The mass difference before and after the acid digestion was considered to be the mass of calcium carbonate precipitated in the specimen. Mass of the precipitate over the mass of sand after digestion is reported as the carbonate content in each specimen.

Microscale Identifications.

X-Ray Diffraction (XRD) analysis was performed on intact pieces of selected specimens to identify the mineral crystal phases in each sample. The samples were ground using an agate mortar and pestle and powdered onto a standard glass slide for XRD analysis. Scanning electron microscopy (SEM) imaging was also performed on intact cemented chunks of material to visualize the morphology of the precipitates and the precipitation pattern in the soil. Energy dispersive X-ray (EDX) analysis was carried out in conjunction with SEM imaging to determine the elemental composition of the precipitates within each sample. The samples were coated with carbon prior to SEM/EDX analysis.

The results of soil treatment in terms of unconfined compressive strength and carbonate content for specimens treated using the three different solutions are presented in Table 1.

TABLE 1

UCS results and carbonate content in the specimens treated with different solutions.

| EICP Solution | Test No. | Peak Strength (MPa) | $CaCO_3$ (%) |
| --- | --- | --- | --- |
| Solution 1 | 1 | .133 | 1.63 |
|  | 2 | .158 | 0.58 |
| Solution 2 | 1 | 1.817 | 0.82 |
|  | 2 | 1.654 | 0.79 |
|  | 3 | 1.763 | 1.17 |
| Solution 3 | 1 | 1.000 | 0.57 |
|  | 2 | 1.396 | 0.71 |

Comparing the unconfined compressive strength of the specimens treated using the baseline solution (Solution 1, no powdered milk) to the modified EICP solution (Solution 2, with powdered milk), adding powdered milk to the EICP solution resulted in unconfined compressive strength between 1.654 MPa and 1.817 MPa for the three specimens treated with the modified EICP solution while the specimens treated with the EICP solution that did not contain powdered milk had unconfined compressive strengths of 0.133 MPa and 0.158 MPa at similar carbonate content. The dramatic increase in strength for the specimens treated with the modified EICP solution was unexpected.

Comparing the specimens treated with Solution 2 (the modified EICP solution) to those treated with Solution 3 (the low concentration modified EICP solution), lowering the concentration of urea and calcium chloride by 62.5% (from 1.0 M urea and 0.67 M $CaCl_2$ to 0.37 M urea and 0.25 M $CaCl_2$) and the concentration of enzyme by about 72% (from 3 g/l to 0.85 g/l) led to a reduction of approximately 30% in the unconfined compressive strength. The average unconfined compressive strength decreased from approximately 1.7 MPa for the three specimens treated with the modified EICP solution to an average unconfined compressive strength of approximately 1.2 MPa for the specimens treated with the low concentration modified EICP solution. The unconfined compressive strength of the specimens treated with the low-concentration modified EICP solution (Solution 3, which contained powdered milk) was an order of magnitude greater than the unconfined compressive strength of the specimens treated with the higher concentration solution that did not contain powdered milk (Solution 1, the baseline solution).

The theoretical maximum carbonate content was approximately 1.4% for the specimens treated with Solutions 1 and 2 (the higher concentration solution) and was about 0.5% for the specimens treated with Solution 3 (the lower concentration solution). For the two specimens treated with Solution 1, the measured carbonate content was approximately 59% less and 16% more than the theoretical maximum. For the three specimens treated with Solution 2, the measured carbonate content was approximately 41% less, 44% less, and 16% less than the theoretical maximum. For the two specimens treated with Solution 3, the measured carbonate content was approximately 14% more and 42% more than the theoretical maximum. Variations in carbonate content may be attributed to non-uniform distribution of the precipitate within each specimen, as only a portion of each specimen was used for acid digestion. Loss of precipitates suspended in the pores or loosely attached to the particles due to rinsing at the end of the treatment process may result in a measured carbonate content less than the amount of carbonate precipitated from the treatment solution.

Example 3

Urease enzyme extraction from various organic sources is described herein.

Urease enzyme from sword jack beans (*Canavalia gladiata*, Sheffield's Seed), jack bean meal (*Canavalia enformis*, Spectrum Chemical), soybeans (*Glycine max*, Laura Soybeans), and sugar baby watermelon seeds (*Citrullus lanatus*, Johnnyseeds) was obtained via three stages of chemical extraction. The sword jack beans and watermelon seeds were dehusked prior to extraction (husk comprises approximately 67% of the mass of watermelon seeds and 14% of the mass of jack beans). In the first stage of enzyme extraction, 50 g of each species was soaked in 200 ml of an extraction solution overnight at pH 7.5 and 4° C. The extraction solution consisted of 20 mM phosphate buffer and 2 mM ethylenediaminetetraacetic acid (EDTA). The solutions containing beans or seeds were then homogenized in a kitchen blender for around 2 minutes to disrupt the cells and tissues for enzyme extraction. Since the jack bean meal was in powder form, the solution containing jack bean meal was homogenized by stirring with a glass rod. Each homogenized mixture was passed through kitchen cheesecloth fabric to separate coarse solids from the enzyme-containing solution. To remove finer insoluble matter, the filtrate was centrifuged for 15 minutes at 21500 g. Excess fat in the supernatant from centrifugation was removed by passing the supernatant through glass wool. The solution obtained in this manner is referred to herein as the crude extract.

In the second stage of enzyme extraction, referred to herein as the first fractionation step, acetone fractionation was used to precipitate (i.e. salt-out) urease proteins from the crude extract. Forty six percent (46%) (v/v) pre-chilled acetone (i.e., acetone at −20° C.) was slowly added to the crude extract while it was being stirred in an ice chamber. The mixture was then centrifuged at between 0° C. and 4° C. at 25000 g for 15 min and the supernatant was discarded. The remaining pellet was suspended in 40 ml of extraction buffer. After letting the suspension stand at 4° C. overnight, the suspension was stirred for 2 hours and centrifuged again at 25000 g between 0° C. and 4° C. for 15 minutes. The supernatant collected following the second centrifugation was the yield of this first fractionation step.

In the third stage of enzyme extraction, referred to herein as the second fractionation step, the extract was further purified using acetone fractionation. In this second fractionation step, the supernatant solution obtained from the previous step was diluted 1:1 with extraction buffer. Next, 25% (v/v) pre-chilled acetone was gently added to the diluted solution and the mixture was immediately centrifuged for 10 min at 21500 g. Finally, 40% (v/v) pre-chilled acetone was added to the supernatant from this centrifugation step and the mixture was centrifuged once again at between 0° C. and 4° C. for 15 min at 25000 g. The pellet from this final centrifugation step was suspended in 20 ml of extraction buffer as the yield of the second fractionation step.

The necessity of using a pH buffer solution and a chelating agent in crude extraction process for jack bean was also assessed in this study. For this purpose, the extraction solution (i.e., the phosphate buffer and EDTA) was replaced with 18.2 MΩ deionized (DI) water for the initial (first stage) crude extraction from the jack beans.

A summary of the results of the activity assessments for the extractions from each plant source is 370 presented in Table 2, below.

| Plant Species | Product | Volume of Extraction ml | Total Units U | Total Protein mg | Specific Activity U/mg of protein | Fold Pure | Loss of Enzyme % |
|---|---|---|---|---|---|---|---|
| Dehusked jack bean | Crude in extraction solution | 130 | 168064 | 5495 | 31 | 1 | 0 |
| | 1st acetone fractionation | 41 | 101710 | 2191 | 46 | 1.48 | 39.5 |
| | 2nd acetone fractionation | 20 | 55873 | 476 | 117 | 3.77 | 66.8 |
| | Crude in water | 126 | 152250 | 5632 | 27 | 1 | 0 |
| Jack bean meal | Crude in extraction solution | 93 | 94634 | 4008 | 24 | 1 | 0 |
| | 1st acetone fractionation | 48 | 39974 | 2167 | 18 | 0.75 | 57.8 |
| | 2nd acetone fractionation | 20 | 19691 | 810 | 24 | 1 | 79.2 |
| Soybean | Crude in extraction solution | 95 | 17093 | 4683 | 4 | 1 | 0 |
| | 1st acetone fractionation | 44 | 12806 | 1598 | 8 | 2 | 25.1 |
| | 2nd acetone fractionation | 21 | 3212 | 427 | 8 | 2 | 81.2 |
| Debusked watermelon seed | Crude in extraction solution | 133 | 20407 | 2013 | 10 | 1 | 0 |
| | 1st acetone fractionation | 56 | 13581 | 609 | 22 | 2.2 | 33.4 |
| | 2nd acetone fractionation | 20 | 6143 | 104 | 59 | 5.9 | 69.9 |

Figure 4:
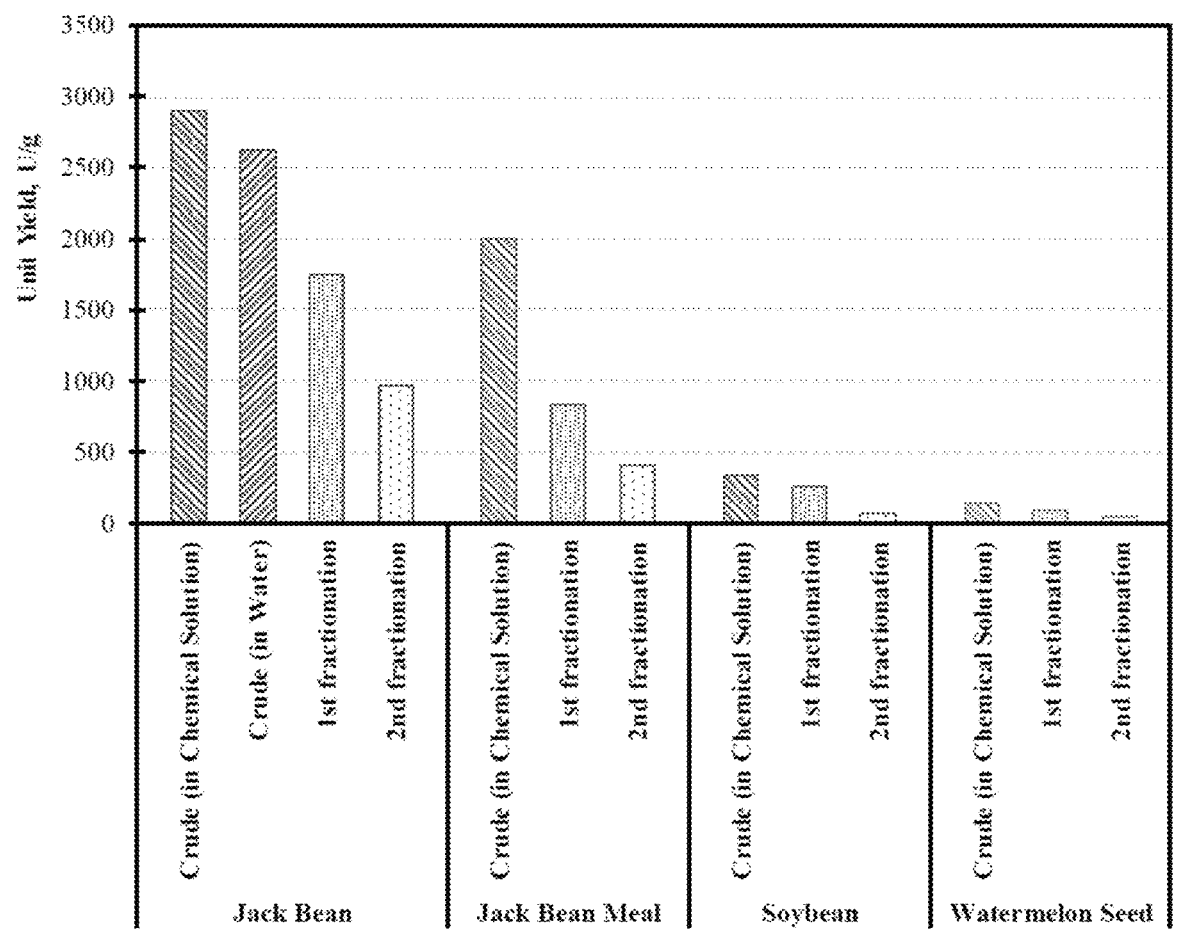
FIG. 4 illustrates urease yield at various points of extraction in accordance with various exemplary embodiments.

The two steps of the purification process (i.e., the first and second fractionation steps) resulted in 2.2-fold and 5.9-fold purification for watermelon seed and 1.5-fold and 3.8-fold purification for jack bean for the two fractionation steps, respectively. The crude extraction from jack bean in DI water resulted in a similar number of total units as the extraction in the phosphate buffer and EDTA solution. The urease proteins in jack bean crude extract may remain stable in DI water without adding pH buffer solution and a chelating agent. FIG. 4 compares the unit yield for each plant source after each extraction and purification step. The lower amount of enzyme units and specific activity of jack bean meal compared to jack bean may be attributed to the process used to create the meal. Heating and grinding methods utilized to produce jack bean meal may result in loss of some urease content.

Example 4

Determination of urease protein purification levels, concentration levels, and activity are described herein.

Figure 5:
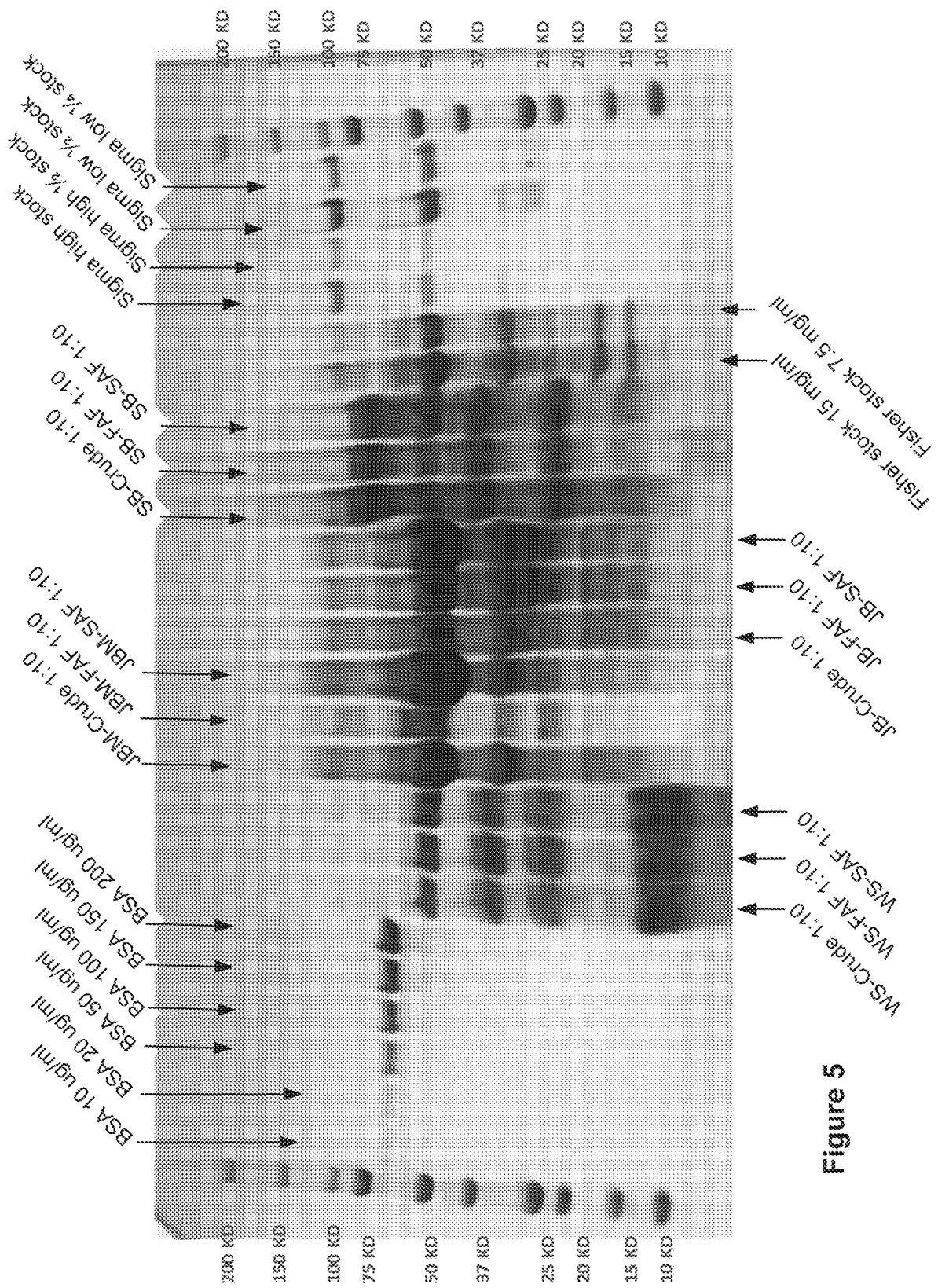
FIG. 5 illustrates SDS-PAGE analysis of urease extract activity in accordance with various exemplary embodiments.

SDS-PAGE (sodium dodecyl sulfate polyacrylamide gel electrophoresis), which separates proteins based on their molecular weight, was employed to quantify the level of purification and verify the presence of urease protein in the crude extract and in the yield from each fractionation step. Three commercial jack bean urease enzymes, referred to herein as high-activity Sigma Aldrich enzyme (U1500, Type III, powder, 42700 U/g activity, Sigma Aldrich), low-activity Sigma Aldrich enzyme (U1875, Type III, supplied in glycerol solution, 800 U/ml activity, Sigma Aldrich) and Fisher Scientific enzyme (U2125, powder, no activity reported on the label, Fisher Scientific), were used as control. In this method, the extracts were first diluted, mixed with 4× SDS-PAGE 217 loading dye containing 25% beta-mercaptoethanol, and heated at 95° C. for 10 minutes. The samples were then loaded on 12% SDS-PAGE resolving gel which was stained with Coomassie blue to express the proteins. The gel was electrophoresed at a constant voltage of 200 V for 35 220 min. FIG. 5 illustrates the presence of urease enzyme in the crude extraction solutions from the four plant sources: jack bean (JB), jack bean meal (JBM), soybean (SB), and watermelon seed (WS). A band in the SDS-PAGE results appears at around 90 kDa in all of the extraction solutions and in the commercial enzymes used as control. Urease protein from plants and fungi are reported to have molecular weights of around 90 kDa.

The Bradford protein assay method was applied to determine the protein concentration in each extraction solution and the commercial enzymes. A commercial protein assay kit (RC DC protein assay kit II, 5000122, Bio-Rad) was used for this purpose. In this colorimetric method, Coomassie blue attaches to protein molecules and creates a blue solution. The color intensity of the solution measured using a spectrophotometer at a wavelength of 595 nm was translated to protein concentration using a standard calibration curve.

Figure 6A:
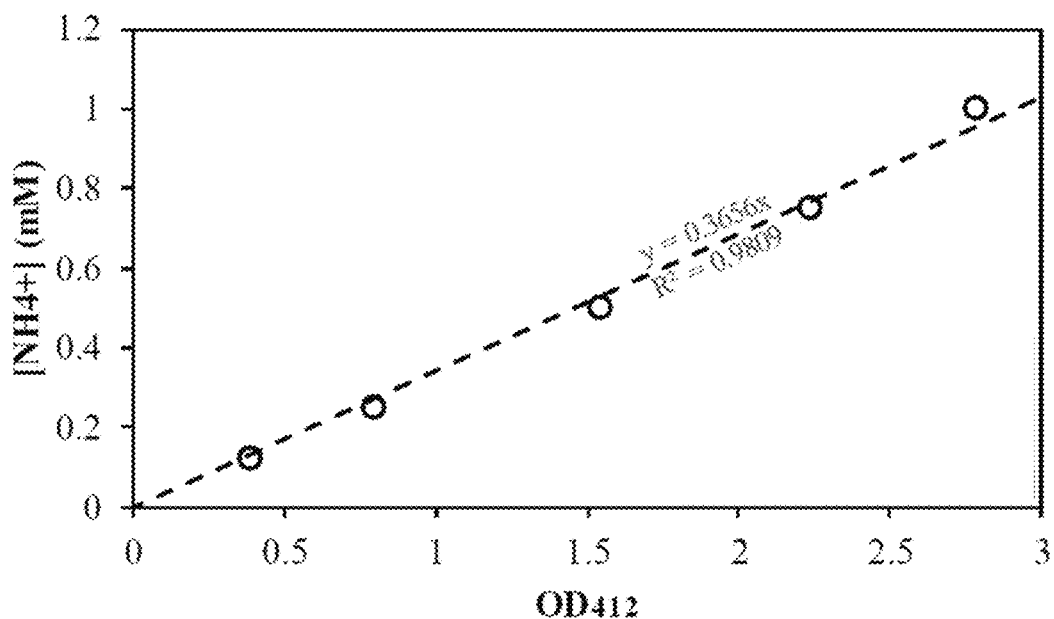
FIG. 6a illustrates a calibration curve used for measurement of urease activity.

To measure the urease activity of the crude extract and the yield from each fractionation step, 0.3 ml of the urease solution was added to 9.7 ml of urea and phosphate buffer solution (pH 7.5) in three 50 ml serum bottles. The concentrations of the urea and phosphate buffer in each bottle were 150 mM and 1 M, respectively. After adding the enzyme solution into each bottle, the bottle was immediately sealed using a stopper and aluminum seal and was gently shaken until the reaction was stopped by adding 5 ml of 10% trichloroacetic acid. The acid was added into the first bottle after 3 minutes, the second bottle after 5 minutes, and the third bottle after 10 minutes. Adding trichloroacetic acid causes precipitation and denaturation of urease protein. It also causes the ammonia gas generated from the solution to be returned into the solution as ammonium ions. After stopping the reaction, each bottle was opened, and the solution was diluted 100-fold using DI water. Then, 2 ml of the diluted solution was added to a cuvette containing 100 µl Nessler's reagent. The cuvette was placed in a spectrophotometer to measure the optical density of the solution at a wavelength of 412 nm (i.e. OD412). The concentration of ammonium liberated in the solution as a result of urea hydrolysis was determined using a calibration curve relating ammonium concentration to OD412. FIG. 6a illustrates the calibration curve utilized. Afterwards, for each enzyme solution, the ammonium concentration was plotted versus time and the decay function in Equation 7 was fitted to each data set.

Equation 7: $Y = a \cdot (1 - b \cdot e^{-cx})$, where a, b, and c are the asymptote, scale, and decay rate of the reaction, respectively.

Figure 6B:
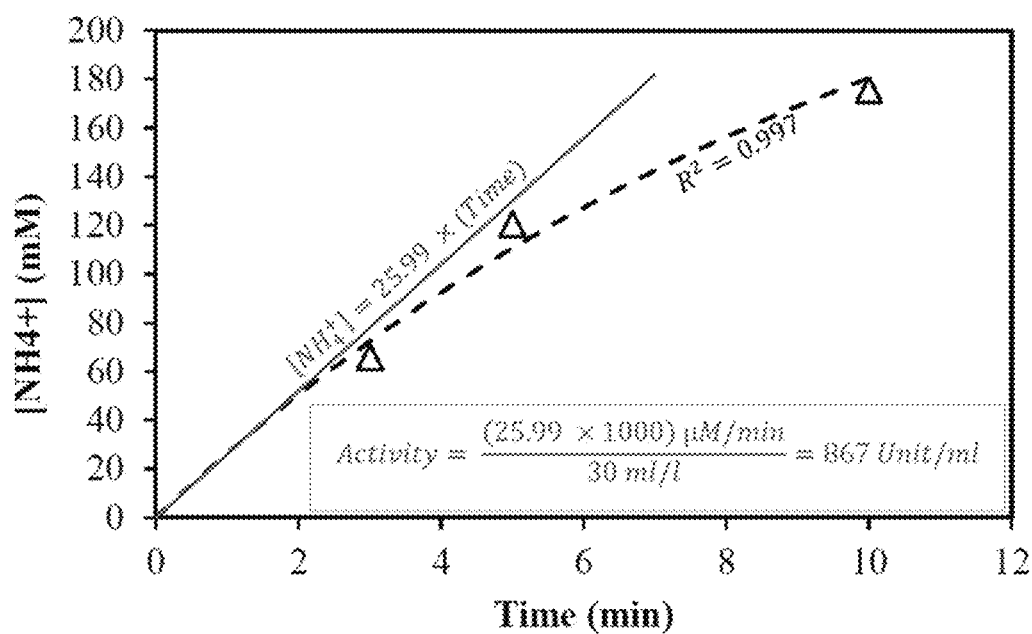
FIG. 6b illustrates urease activity of low-activity Sigma Aldrich enzyme in accordance with various exemplary embodiments.

The enzyme activity of the solution was calculated by dividing the slope of the initial linear part of the ammonium-time curve by enzyme concentration, as illustrated in FIG. 6b. To validate this activity measurement method, the activity of the low-activity Sigma Aldrich enzyme with a manufacturer-reported activity of 800 U/ml was measured. The activity of the Fisher Scientific enzyme (which does not have any activity value reported on the label) was also measured using this method for documentation purposes.

Example 6

Correlation between non-urease protein content and EICP-treated soil was demonstrated as described herein.

EICP-treated soil specimens were evaluated for carbonate content, strength, morphology, kinetics, and mass with tube tests. Five EICP solutions were generated using various sources of urease, namely, crude urease extract in extraction solution, cruse urease extract in water, and three commercial urease enzymes (Fisher Scientific urease, High activity Sigma Aldrich urease, and Low activity Sigma Aldrich urease, respectively).

The compositions of the EICP solutions were the same except for the five different sources of urease enzyme. Each 50 ml test tube contained 50 ml of EICP treatment solution that consisted of 1.0 M urea, 0.67 M $CaCl_2$-dihydrate, 4 g/l non-fat milk powder, and around 13,000 Units of free urease enzyme per liter. The number of urease enzyme units was fixed across all five solutions (approx. 13,000 units); however, the total protein concentration of each of the five solutions varied based on the source, purity, and/or extraction method of urease.

TABLE 4

Protein concentration of various urease extracts and/or sources.

|  | Crude Extract in Extraction Solution | Crude Extract in Water | Fisher Scientific | Sigma Aldrich_High activity | Sigma Aldrich_Low activity |
|---|---|---|---|---|---|
| Protein mg/g or mg/ml | 422 | 44.7 | 198.7 | 122 | 1.1 |
| Specific Activity U/mg of protein | 31 | 27 | 21 | 323 | 814 |

Therefore, the relative differences in protein concentrations of the five solutions are due to the presence of non-urease proteins.

Each tube was placed on a shaker at 100 rpm and room temperature (22° C.±2° C.) for 96 hours. 100 µl samples were taken from each tube after 1, 2, 4, 16, 24, 48, and 72 hours, immediately diluted by 1000 times, and stored at 0-4° C. Afterwards, the diluted samples were analyzed via ion chromatography to determine the concentration of dissolved (unconsumed) calcium ions in the solution, from which the approximate rate of precipitation in each solution can be estimated. The pH of the reaction solution in each tube was also measured after 1, 16, 24, 48, and 72 hours. At the end of the test, each tube was centrifuged at 1500 rpm for 10 minutes and the supernatant was discarded. The remaining precipitates were rinsed twice by adding 30 ml DI water. After each rinsing, supernatant was removed via centrifugation at 1500 rpm for 10 minutes. Finally, the precipitates were dried at 40° C. until constant mass achieved. The mass of precipitates in each tube was measured by subtracting the mass of each empty tube from the mass of the tube after the final centrifugation step. Microscale identification analysis to characterize precipitate morphology (e.g., scanning electron microscopy and energy dispersive x-ray spectroscopy) was conducted on the precipitates.

Figure 7:
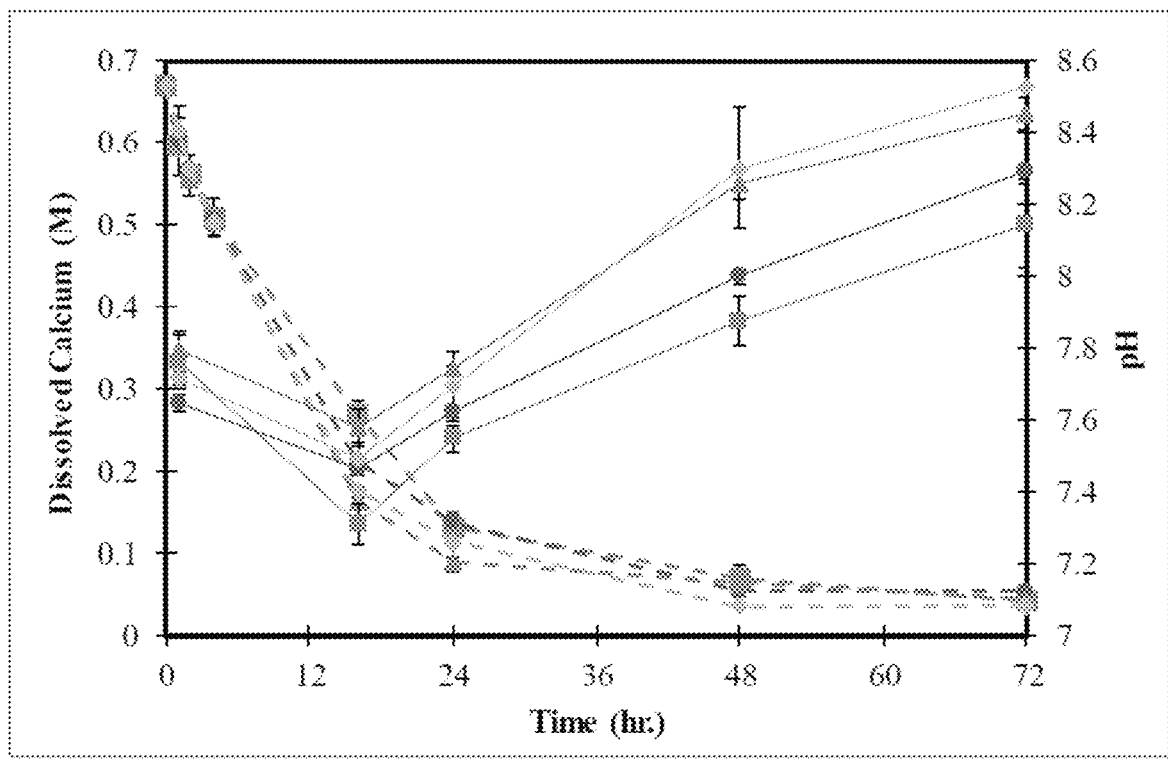
FIG. 7 illustrates dissolved calcium and pH of EICP solution over time in accordance with various exemplary embodiments.
Figure 8A:
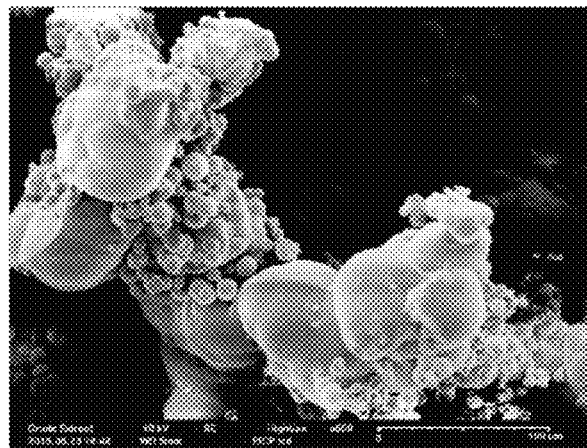
FIG. 8a through 8e illustrate SEM images of precipitates in tubes containing (a) crude extract, (b) Fisher Scientific enzyme, (c) high-activity Sigma Aldrich enzyme, and (d) low-activity Sigma Aldrich 506 enzyme; and (e) XRD spectra of the precipitates from each tube in accordance with various exemplary embodiments.
Figure 8B:
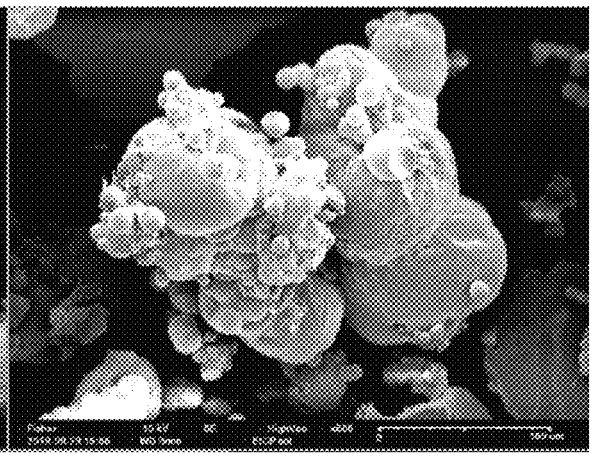
Figure 8C:
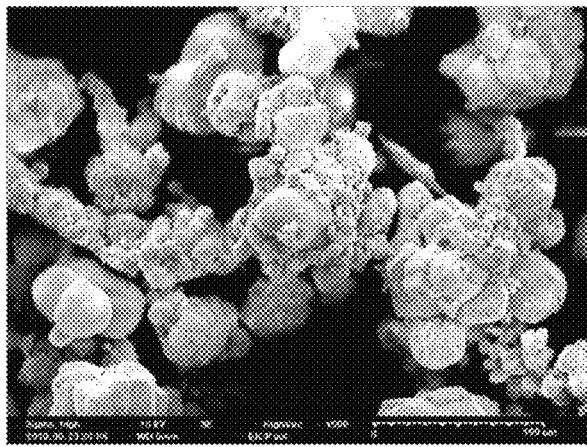
Figure 8D:
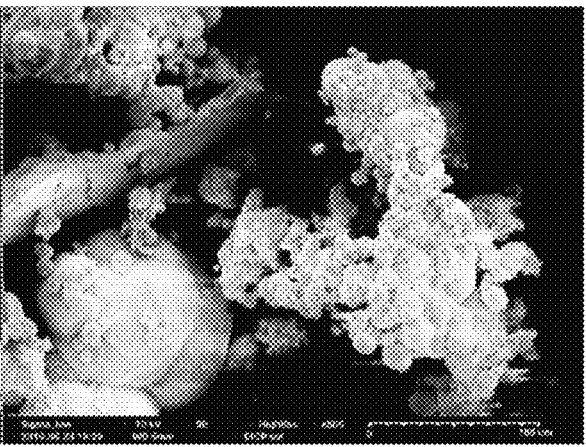
Figure 8E:
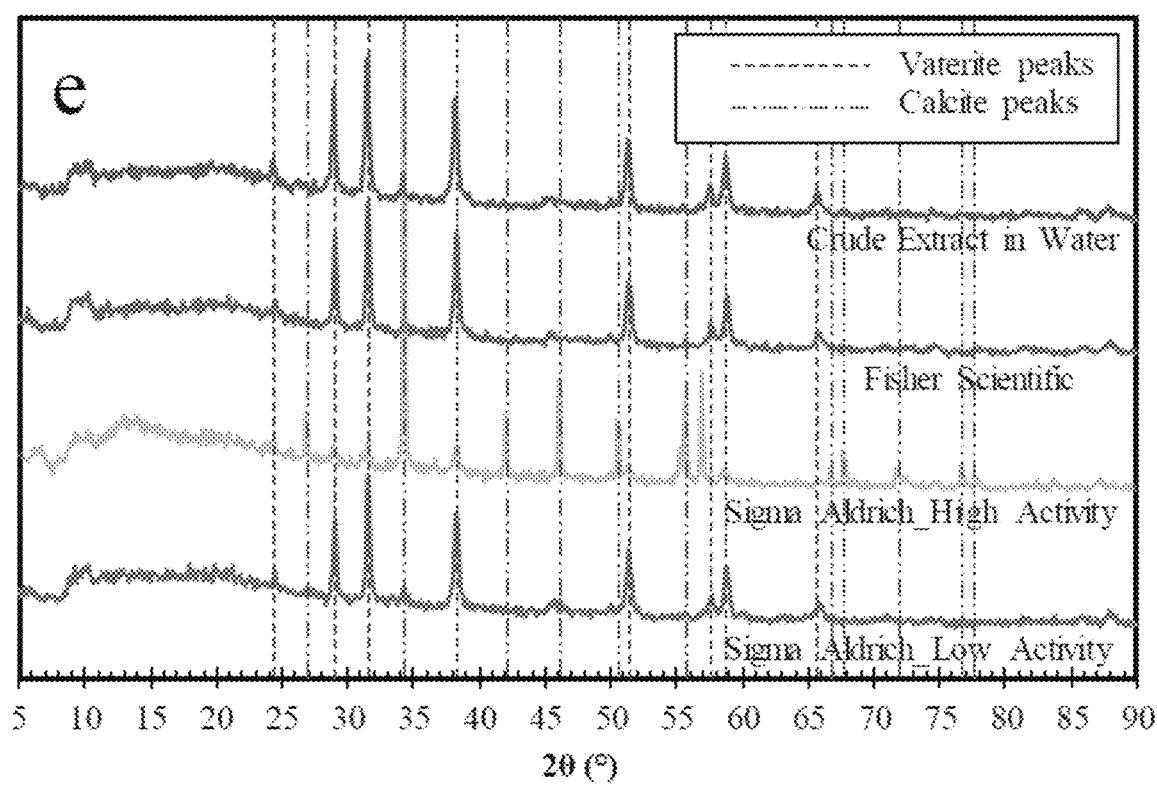

To evaluate the effect of the different enzyme solutions on carbonate precipitation kinetics, pH and dissolved calcium in EICP solutions with a urease activity of 13000 U/l were measured at different time intervals. As illustrated in FIG. 7, the dissolved calcium ion measurements demonstrated that the rate of calcium ion removal from the EICP solution, a proxy for calcium carbonate precipitation, among the solutions with different enzymes are not considerably different. In FIG. 7, dissolved calcium (dashed lines) and pH (solid lines) are measured in EICP solution containing jack bean crude extract (■), Fisher Scientific enzyme (•), high-activity Sigma Aldrich 445 enzyme (▲), and low-activity Sigma Aldrich enzyme (♦). Notably, there was little difference within the initial six hours, which is when EICP-treated soil specimens gain most of their strength based on our empirical observations. In the other words, the precipitation rate is not considerably affected by variation in the enzyme type when initial urease activity in all the tubes were adjusted to 13,000 U/l. The change in pH with time of the different EICP solutions was also similar.

The amount of carbonate precipitation induced by the different enzyme solutions was also similar. Precipitation mass measurements yielded an average precipitation of 3.425 g, 3.518 g, 3.369 g, 449 and 3.387 g after 96 hours in the tubes containing crude extract, Fisher Scientific, high-activity 450 Sigma Aldrich, and low-activity Sigma Aldrich, respectively. It should be noted that, although the precipitates were thoroughly rinsed with DI water and dried until a constant mass achieved, the mass of precipitation in all the tubes was more than the maximum calcium carbonate precipitation of 3.353 g based upon the amount of calcium ion the EICP solution. Potential sources of this extra mass of precipitate could be precipitation of cations imported from the enzyme sources into EICP solution or non-carbonate water-insoluble compounds such as milk and enzyme proteins that precipitated (or salted-out) during the EICP reactions.

Precipitates in the test tubes containing crude extract and Fisher Scientific enzyme clumped together and stuck to the bottom of the tubes such that rigorous hand shaking could not disperse the precipitates into the solution. However, the precipitates in the tubes containing high-activity and low-activity Sigma Aldrich enzymes were easily dispersed in the solution under gentle agitation. The clumping of precipitates in the tubes containing crude extract and Fisher Scientific enzyme may be due to adhesive effect of non-urease proteins which precipitated as a result of interaction between these enzymes' composition and EICP constituents. The crude extract and Fisher Scientific enzyme, which are less refined enzymes, contain compounds (e.g. non-urease proteins, salts, fatty acids, sugars, etc.) which may react with the non-fat milk in EICP solution and result in coagulation of milk proteins, including casein. Non-urease proteins may be also salted out due to change in pH and ion concentrations within EICP reactions. As illustrated in Table 4, the crude extract and Fisher Scientific enzyme introduce much greater amounts of non-urease proteins into the EICP solution.

Morphology and crystal phases of the precipitates obtained in each test tube were evaluated using SEM and XRD. As shown in FIGS. 8a through 8e, it was observed that the precipitates in the tubes containing crude extract, Fisher Scientific, and low-activity Sigma Aldrich enzymes are mainly composed of relatively large spherical vaterite crystal whereas the precipitates in the tubes containing high-activity Sigma Aldrich enzyme are mainly smaller deteriorated calcite crystals agglomerated together. Obtaining vaterite as predominant crystal phase in the tubes of crude extract, Fisher Scientific, and low-activity Sigma Aldrich enzymes might be attributed to higher concentration of organic compounds imported from these enzymes into EICP solution. Crude extract and Fisher Scientific enzyme introduce a higher concentration of proteins into EICP solution (see Table 4). The presence of a protein can modify the rhombohedral face of calcite crystals and reduce their size at low concentration, turn it into spherical calcite crystal at a higher concentration, and at some point, prevents calcite formation.

The crude jack bean extract and the commercial enzymes were used for EICP treatment of granular soil (i.e., sand).

The EICP-treated soil was then subject to UCS testing. The treatment solution consisted of 1.0 M urea, 0.67 M CaCl2-dihydrate, 4 g/l non-fat milk powder, and around 13,000 316 Units of free urease enzyme per liter. One pore volume of treatment solution was percolated into a 5.1 cm-inner diameter closed bottom soil column containing Ottawa 20/30 silica sand (US Silica Company, >99.8% SiO2, emax=0.74, emin=0.50, D50=0.7 mm). Each column contained 350 g sand with a height of around 10.2 cm, resulting in an approximate relative density for the sand prior to treatment of approximately 78 percent. Three specimens were treated for each EICP solution.

The EICP-treated specimens were extracted from their columns after a curing period of around three days at room temperature, soaked in DI water to remove soluble salts, and then subject to UCS testing at a strain rate of 1.27 mm/min. All the specimens were thoroughly soaked in tap water immediately before UCS testing to minimize the effect of capillarity on the measured UCS. Afterwards, around 250 g of each specimen were subjected to carbonate content determination using gravimetric acid digestion. In this method, the treated soil was soaked in 4 M hydrochloric acid to dissolve the carbonate, thoroughly rinsed with tap water, and then dried. The difference between the mass of dry soil before and after acid digestion represents the mass of carbonate precipitation. The mass of precipitation over the mass of dry soil after digestion is reported as the carbonate content of the treated specimen. All of the soil column experiments and associated tests were conducted in triplicate.

Scanning electron microscopy (SEM) was employed to evaluate the morphology of the precipitates from the test tube experiments and the treated soil specimens. X-Ray powder diffraction (XRD) with Co-Kα radiation was applied to identify the mineral crystal phases in the precipitates obtained from each test tube test. Energy dispersive X-ray (EDX) spectroscopy was used for elemental identification of the precipitates in the treated soil specimens. The samples were sputter-coated with gold (Au) prior to SEM imaging and EDX spectroscopy.

Figure 9A:
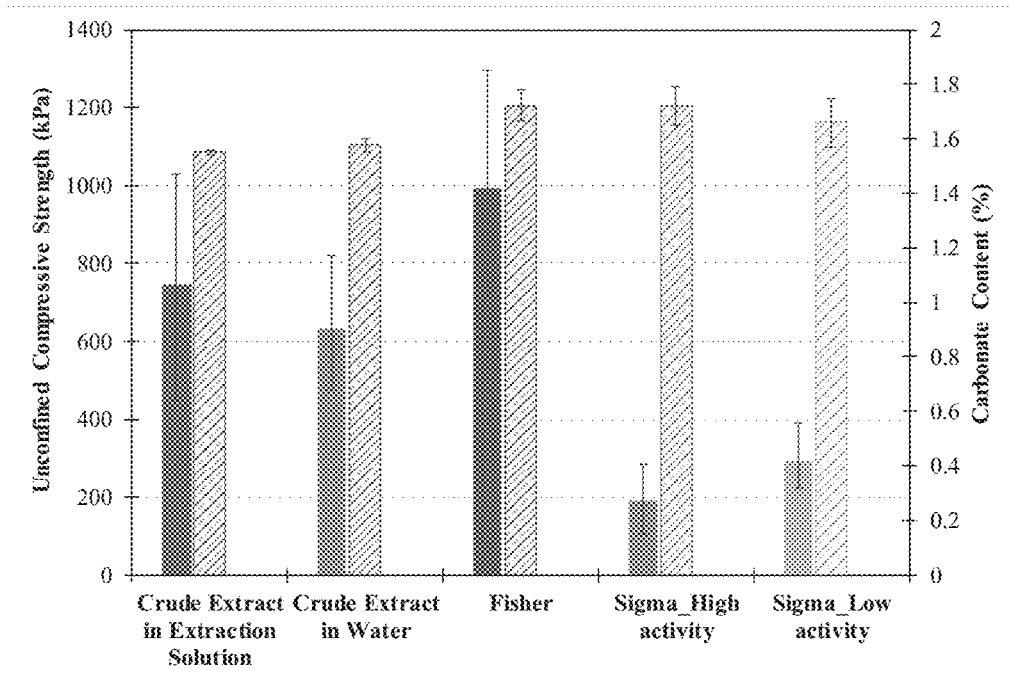
FIG. 9a illustrates unconfined compressive strength and carbonate content for various EICP-treated soil specimens in accordance with various exemplary embodiments.
Figure 9B:
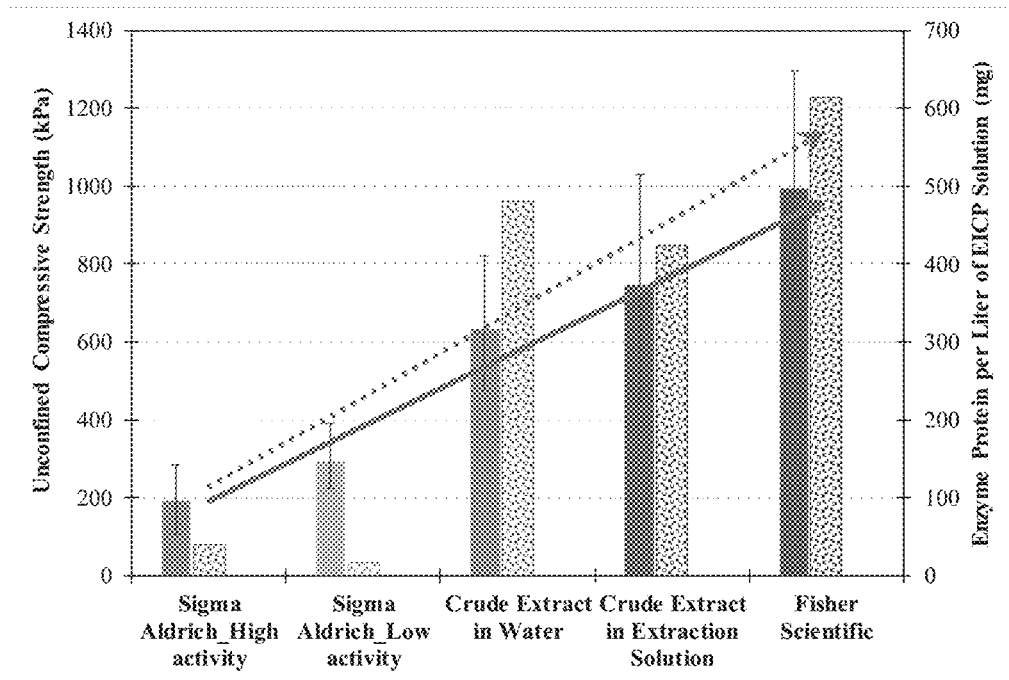
FIG. 9b illustrates unconfined compressive strength and non-urease protein concentration for various EICP-treated soil specimens in accordance with various exemplary embodiments.

FIG. 9a shows the results of unconfined compression strength testing (filled bars) and the associated carbonate concentrations (hatched bars) for soil specimens treated with each of the five EICP treatment solutions. The carbonate concentrations of the treated soil specimens are similar (approx. 1.5-1.7% w/w), but the strengths are significantly different (ranging from about 200 to about 1000 kPa); this indicates that carbonate content is not the controlling factor in determining strength. FIG. 9b shows the results of the results of unconfined compression strength testing (filled bars) relative to the non-urease protein concentrations (dotted bars). The concentration of non-urease proteins and other impurities associated with urease enzyme (organics/protein additives) correlate with and enhance the strength gain in the EICP-treated soil specimens.

Based on the results the Examples described above, namely, EICP treatment using crude jack bean extract and commercial enzymes, crude jack bean extract may be as effective as, or more effective than, commercial enzymes for EICP treatment of soil. Using crude jack bean extract obtained through the extraction process disclosed herein (i.e., blending and filtration), whether with or without use of any chemicals, will make the use of EICP for soil improvement (and for treatment of cracks on concrete or rock) considerably cheaper and therefore more feasible for field implementation than it would be if currently available commercial urease has to be used. Powdering the enzyme significantly reduces the volume of the product, further reducing costs associated with its use for practical engineering purposes.

Obtaining higher UCS in the specimens treated with jack bean crude extracts and Fisher Chemical enzyme, both of which have been demonstrated to be less pure than the Sigma-Aldrich enzymes, indicate that a less purified and less expensive crudely extracted enzyme can actually result in a higher strength then a purified enzyme when used for biocementation. The lower strength obtained using the highly purified Sigma-Aldrich enzymes may be attributable to the tendency of pure urease enzymes to co-precipitate with calcium carbonate, reducing the amount of enzymatic precipitation (Larsen et al. 2008). In addition, less purified enzymes may be associated with other proteins which can stabilize them against changes in pH and ionic strength in an EICP solution.

The results presented herein demonstrate that the crude urease extract that is the subject of this invention is more effective for EICP treatment than higher purity commercial enzymes currently available. The lower cost of producing the crude extract significantly lowers the cost of soil improvement using EICP, making it cost competitive with other soil improvement processes.

Certain principles of the present disclosure may be utilized in connection with various principles disclosed in: (i) U.S. patent application Ser. No. 15/029,316 filed on Apr. 14, 2016, now U.S. Patent Application Publication No. 2016-0236943 entitled "MINERAL PRECIPITATION METHODS"; (ii) U.S. patent application Ser. No. 15/029,866 filed on Apr. 15, 2016, now U.S. Patent Application Publication No. 2016-0244931 entitled "MINERAL PRECIPITATION METHODS"; (iii) U.S. patent application Ser. No. 15/803,700 filed on Nov. 3, 2017, now U.S. Patent Application Publication No. 2018-0119185 entitled "CEMENTATION METHODS"; and/or PCT Patent Application No. PCT/US19/50474 filed on Sep. 10, 2019 entitled "BIOCEMENTATION SYSTEMS AND METHODS." The contents of each of the foregoing applications are hereby incorporated by reference in their entirety (except for any subject matter disclaimers or disavowals, and except to the extent that the incorporated material is inconsistent with the express disclosure herein, in which case the language in this disclosure controls).

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method of producing a powdered crude extract for biocementation, the method consisting of:
    soaking a seed in an aqueous solution for between 12 and 24 hours to form a soaked seed, wherein the seed comprises jack bean, and wherein the aqueous solution consists of water;
    subsequently homogenizing the soaked seed to produce a homogenized suspension with urease proteins and non-urease proteins;
    filtering the homogenized suspension to produce a crude extract, wherein a purification fold of the crude extract is equal to 1; and
    lyophilizing and/or drying the crude extract to produce the powdered crude extract, and wherein:
        the powdered crude extract comprises urease proteins and non-urease proteins, and
        the powdered crude extract is produced for a biocementation process for enzyme induced carbonate precipitation (EICP) treatment of soil.

2. The method of claim 1, wherein the filtering comprises:
    passing the homogenized suspension through a first filter to produce a solution; and
    passing the solution through a second filter to produce the crude extract.

3. The method of claim 2, wherein the second filter comprises glass wool.

4. The biocementation process of claim 1, further comprising adding urea, a source of calcium ions, and an enzyme stabilizer to the powdered crude extract to produce a biocementation solution for the EICP treatment of the soil.

* * * * *